(12) United States Patent
Umeda et al.

(10) Patent No.: US 8,254,509 B2
(45) Date of Patent: Aug. 28, 2012

(54) RECEIVER

(75) Inventors: Masataka Umeda, Kawasaki (JP);
Takanori Iwamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 41 days.

(21) Appl. No.: 13/028,784

(22) Filed: Feb. 16, 2011

(65) Prior Publication Data
US 2011/0200089 A1  Aug. 18, 2011

(30) Foreign Application Priority Data

Feb. 18, 2010 (JP) .................................. 2010-33152
Dec. 22, 2010 (JP) ............................... 2010-285278

(51) Int. Cl.
*H04B 7/10* (2006.01)
*H04L 1/02* (2006.01)

(52) U.S. Cl. ........ 375/347; 375/232; 375/260; 375/267; 375/346; 375/350; 370/203; 370/208; 370/210

(58) Field of Classification Search .......... 375/229–236, 375/260, 267, 346–350; 370/203–211
See application file for complete search history.

(56) References Cited

U.S. PATENT DOCUMENTS

| 2006/0291375 A1 | 12/2006 | Nishikawa |
| 2006/0294170 A1 | 12/2006 | Matsuoka et al. |
| 2007/0274406 A1* | 11/2007 | Adachi ........................ 375/260 |
| 2008/0293371 A1* | 11/2008 | Kishigami et al. ......... 455/278.1 |

FOREIGN PATENT DOCUMENTS

| JP | 2004-350242 A | 12/2004 |
| JP | 2005-130439 A | 5/2005 |
| JP | 2007-6067 A | 1/2007 |
| JP | 2007-6264 A | 1/2007 |

OTHER PUBLICATIONS

S. Hara et al., "A Pre-FFT OFDM Adaptive Antenna Array with Eigenvector Combining", IEEE International Conference on Communications 2004, vol. 4, pp. 2412-2416.
S. Hara et al., "A Pre-FFT OFDM Adaptive Array Antenna with Eigenvector Combining", IEICE Transactions, Communications, Aug. 2006, vol. E89-B, No. 8, pp. 2180-2188.
T. Uraguchi et al., "The Institute of Electronic, Information and Communication Engineers", 2006, vol. J83-B, No. 2, pp. 216-224.

* cited by examiner

*Primary Examiner* — Curtis Odom
(74) *Attorney, Agent, or Firm* — Arent Fox LLP

(57) ABSTRACT

A receiver receives a reception signal subjected to orthogonal frequency division multiplexing modulation or orthogonal frequency division multiple access modulation. The receiver has: an array antenna for receiving the reception signal; adaptive equalizers provided in each of the plurality of antennas, and reducing advanced or delayed waves having a delay time to a main wave in the reception signal; a spatial diversity combining portion which multiplies output signals of the adaptive equalizers by a weighting coefficient and adds the multiplied signals; a weight control portion generating the weighting coefficient; and an equalizer setting unit which estimates an arrival angle and a delay time for each path of the reception signal, and based on the estimation, decides an interference wave to be eliminated by the adaptive equalizers among interference waves, and sets in the adaptive equalizers the delay time of the decided interference wave.

13 Claims, 30 Drawing Sheets

CONFIGURATION OF RECEIVER

CONFIGURATION OF OFDM SYMBOL

FIG.2
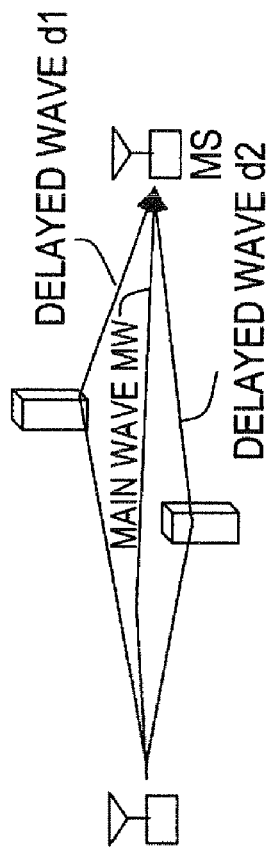
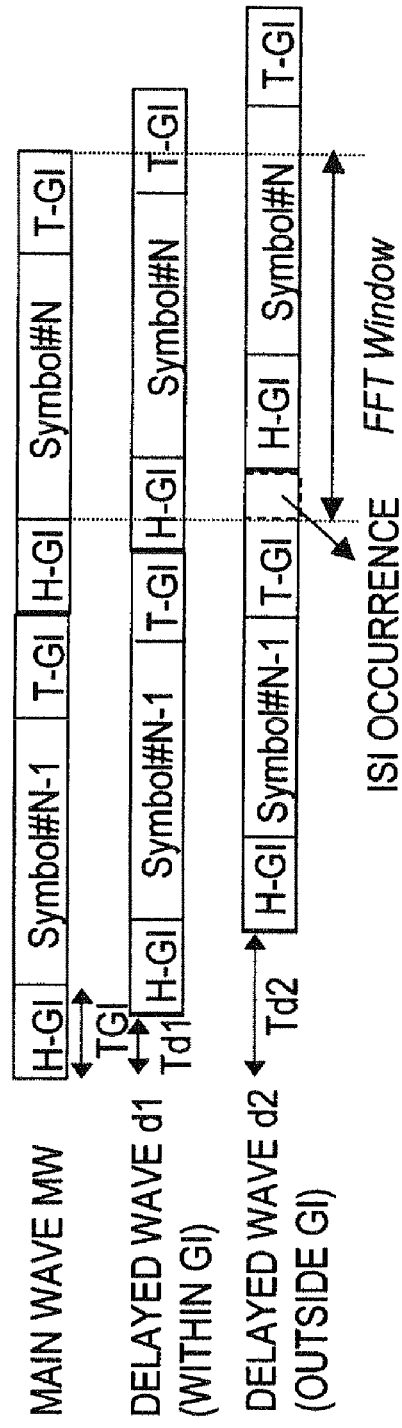

FIG.9 CONFIGURATION OF DELAYED WAVE EQUALIZER (FOR NUMBER OF TAPS N = 5)

CONFIGURATION OF ADVANCED WAVE EQUALIZER (FOR NUMBER OF TAPS N = 5)

FIG.15 CONFIGURATION OF RECEIVER IN SECOND EMBODIMENT

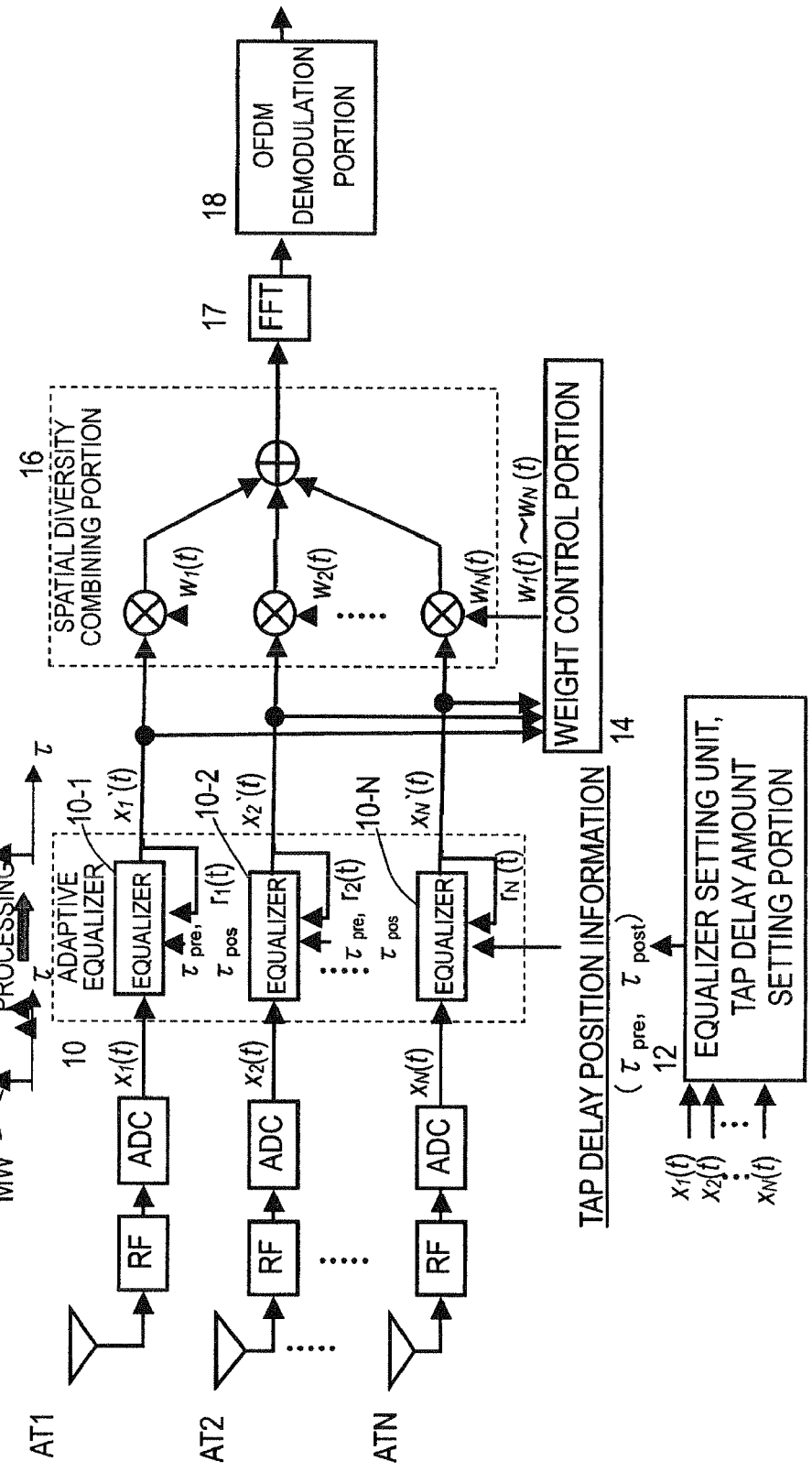

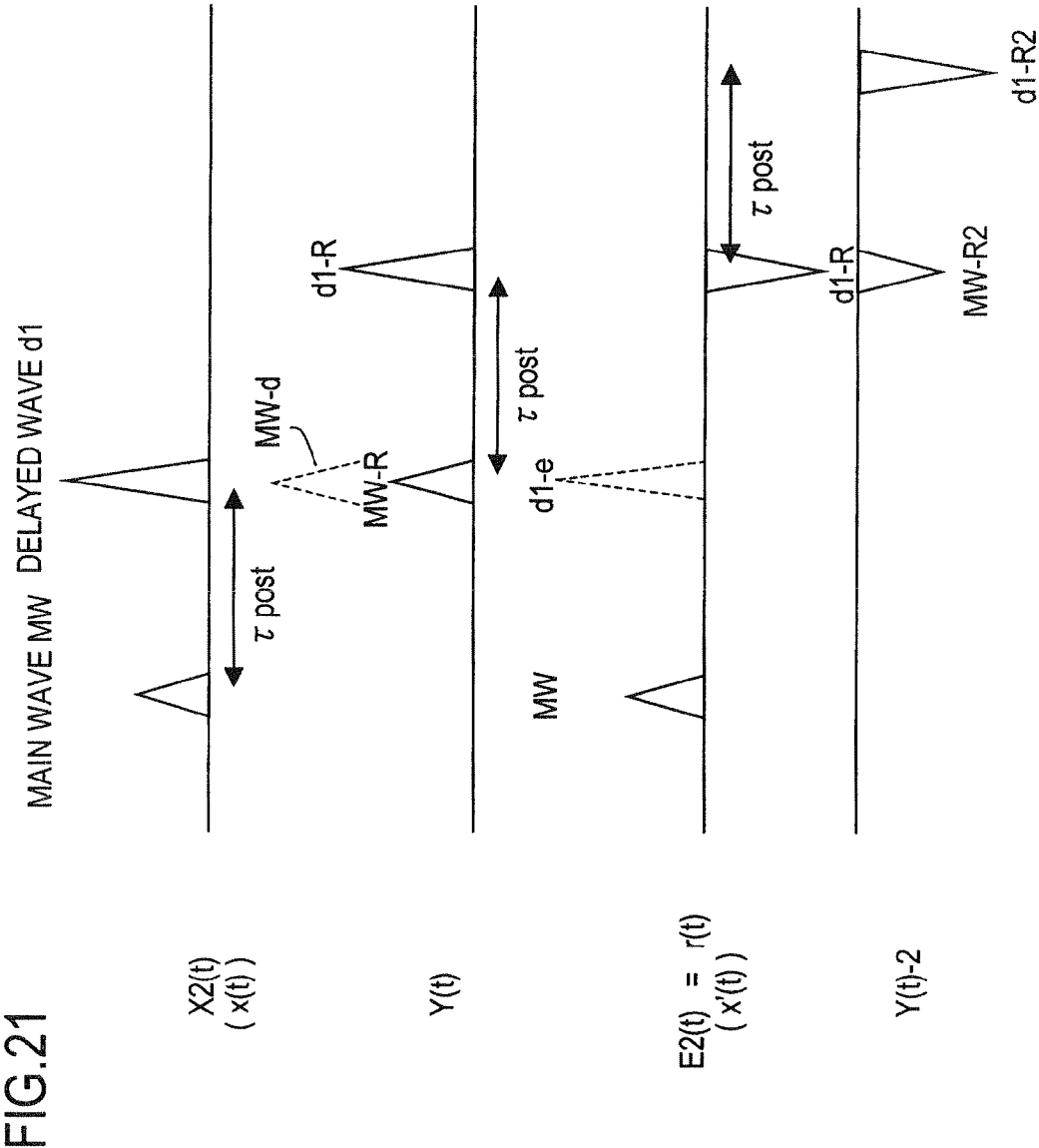

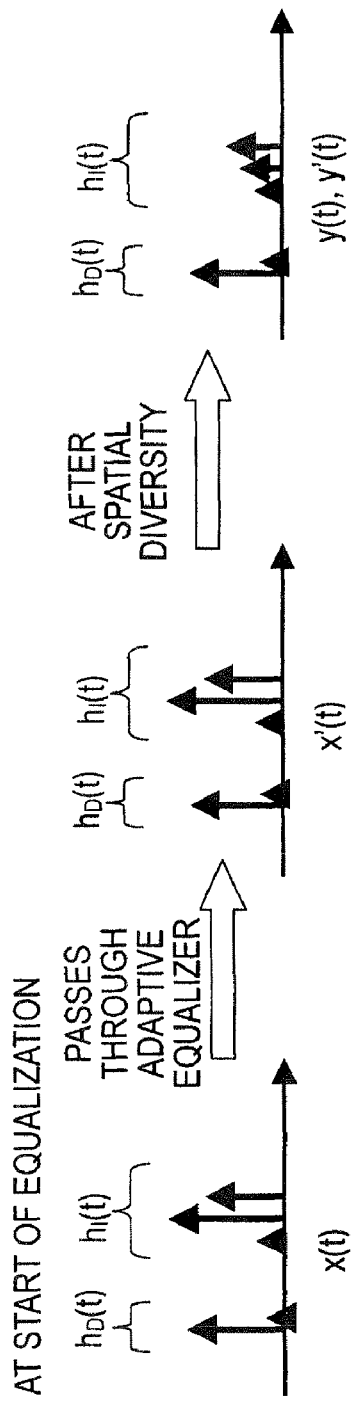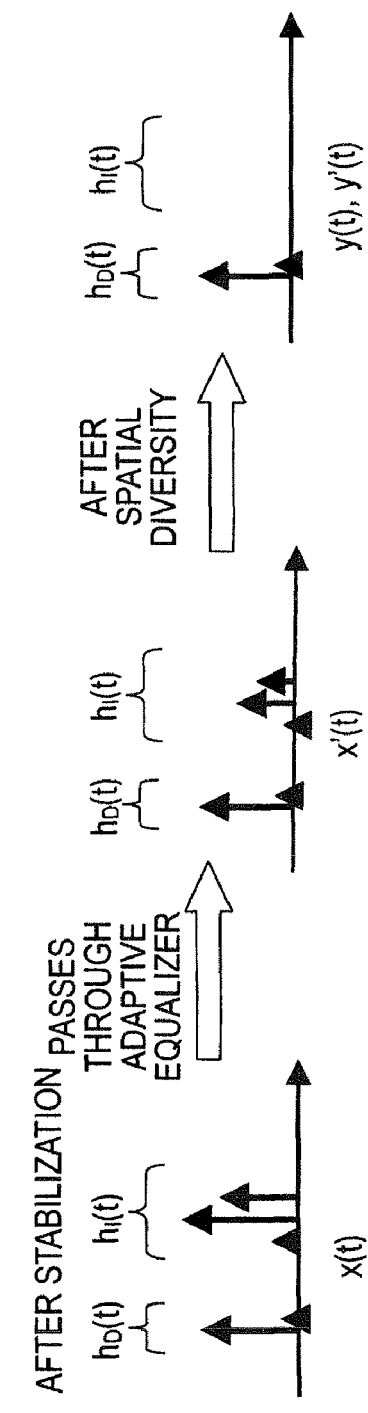
FIG.25A CASE OF D/U ≤ 0 (DESIRED WAVE POWER < INTERFERENCE WAVE POWER)
FIG.25B

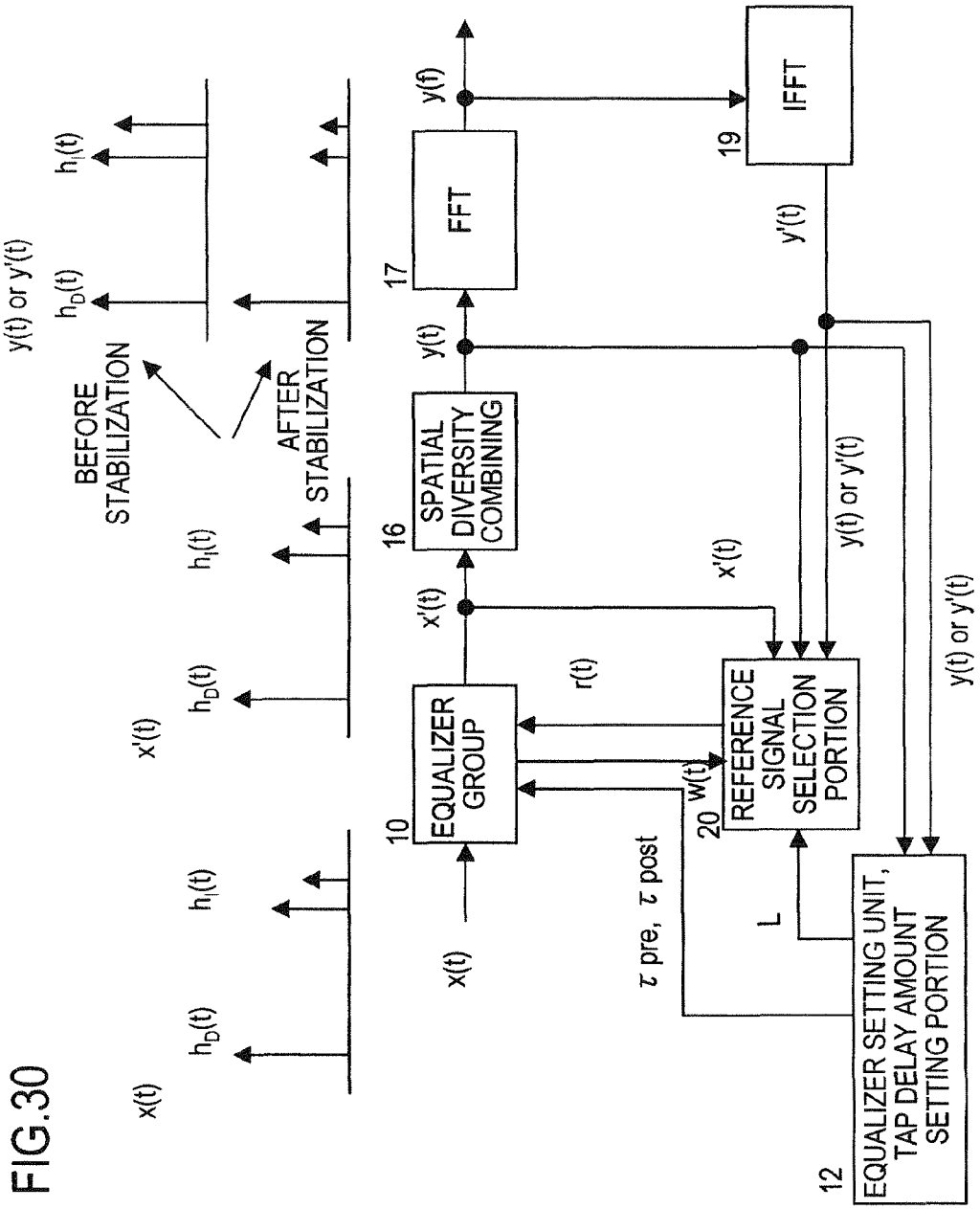

RECEIVER

CROSS-REFERENCE TO RELATED APPLICATIONS

This application is based upon and claims the benefit of priority of the prior Japanese Patent Application No. 2010-033152, filed on Feb. 18, 2010, and the Japanese Patent Application No. 2010-285278, filed on Dec. 22, 2010, the entire contents of which are incorporated herein by reference.

BACKGROUND OF THE INVENTION

1. Field of the Invention

The present invention relates to a receiver in an OFDM or OFDMA communication system.

2. Description of the Related Art

OFDM (Orthogonal Frequency Division Multiplexing) and OFDMA (Orthogonal Frequency Division Multiple Access) communication systems are widely used in digital terrestrial broadcasting, WiMAX, and other systems. In an OFDM or OFDMA communication system, a transmitter uses transmission data to modulate a plurality of subcarriers the frequencies of which are orthogonally related, the OFDM frequency-domain signals are subjected to IFFT and converted into OFDM time-domain signals, are up-converted into high-frequency signals, and are transmitted through space. On the other hand, a receiver which receives this performs down-conversion of the received high-frequency signals, performs FFT to convert the OFDM time-domain signals into OFDM frequency-domain signals, performs demodulation of the plurality of subcarriers, and extracts the reception data. In such an OFDM or OFDMA system, multiple carriers are used for transmission and reception.

Further, in OFDM or OFDMA, in order to address multi-path fading, a portion of the signal at the end of a symbol is copied to the beginning of the symbol to provide a guard interval (GI). And, even when, due to multipath fading, a delayed wave delayed from the main wave or an advanced wave advanced from the main wave is received simultaneously, if the delay amount of the delayed wave and the advanced wave are within the GI interval, there is no interference from the advanced wave or the delayed wave.

However, if a delayed wave and advanced wave occur with a delay amount exceeding the GI interval, adjacent symbols enter within the FFT window, and there is interference from adjacent symbols. That is, intersymbol interference (ISI) occurs, and degradation of the reception signal may occur. Hence there have been various proposals to eliminate such interference waves.

For example, S. Hara, M. Budsabathon and Y. Hara, "A pre-FFT OFDM adaptive antenna array with eigenvector combining", IEEE International Conference on Communications 2004, vol. 4, pp. 2412-2416, June 2004; T. Uraguchi, N. Kikuma and N. Inagaki, "Application of DCMP adaptive array to OFDM-CDMA communication system", IEICE Transactions, B, Communications, 83-B(2), pp. 216-224, February 2000; Japanese Patent Application Laid-open No. 2007-6067; and Japanese Patent Application Laid-open No. 2007-6264.

The effect of spatial diversity in suppressing interference waves has the characteristic of depending on the arrival angle for each path; when the arrival angles of an interference wave and the desired wave are close, there is the problem that interference wave elimination is difficult. Also, there is the problem that, when eliminating an interference wave by spatial diversity combining, if the number of paths exceeds the degrees of freedom of the array antenna (the sum of the number of directional beams and the number of directional nulls), interference wave elimination is not possible.

SUMMARY

According to an embodiment, a receiver receives a reception signal subjected to orthogonal frequency division multiplexing modulation or orthogonal frequency division multiple access modulation. The receiver has: an array antenna having a plurality of antennas for receiving the reception signal; adaptive equalizers, each of which is provided in each of the plurality of antennas, and each of which reduces advanced waves or delayed waves having a delay time set with respect to a main wave in the reception signal; a spatial diversity combining portion which multiplies each of output signals of the adaptive equalizers by a weighting coefficient and adds the multiplied signals; a weight control portion which generates the weighting coefficient based on each of the output signals of the adaptive equalizers; and an equalizer setting unit which estimates an arrival angle for each path and a delay time for each path of the reception signal, and based on each of the estimated arrival angles and delay times of a plurality of paths, decides an interference wave for elimination to be eliminated by the adaptive equalizers among interference waves whose delay time with respect to the main wave exceeds a guard interval time, and sets in the adaptive equalizers the delay time of the interference wave for elimination with respect to the main wave.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 explains intersymbol interference in multipath fading.

FIG. 19 depicts the configuration of a receiver which employs an equalizer output as a reference signal in a TAP coefficient computation portion in an equalizer.

FIG. 21 explains divergence of TAP coefficients.

FIG. 25 is a separate explanation of operation of the receiver of the third embodiment.

FIG. 30 explains third control.

DESCRIPTION OF EMBODIMENTS

Figure 1:
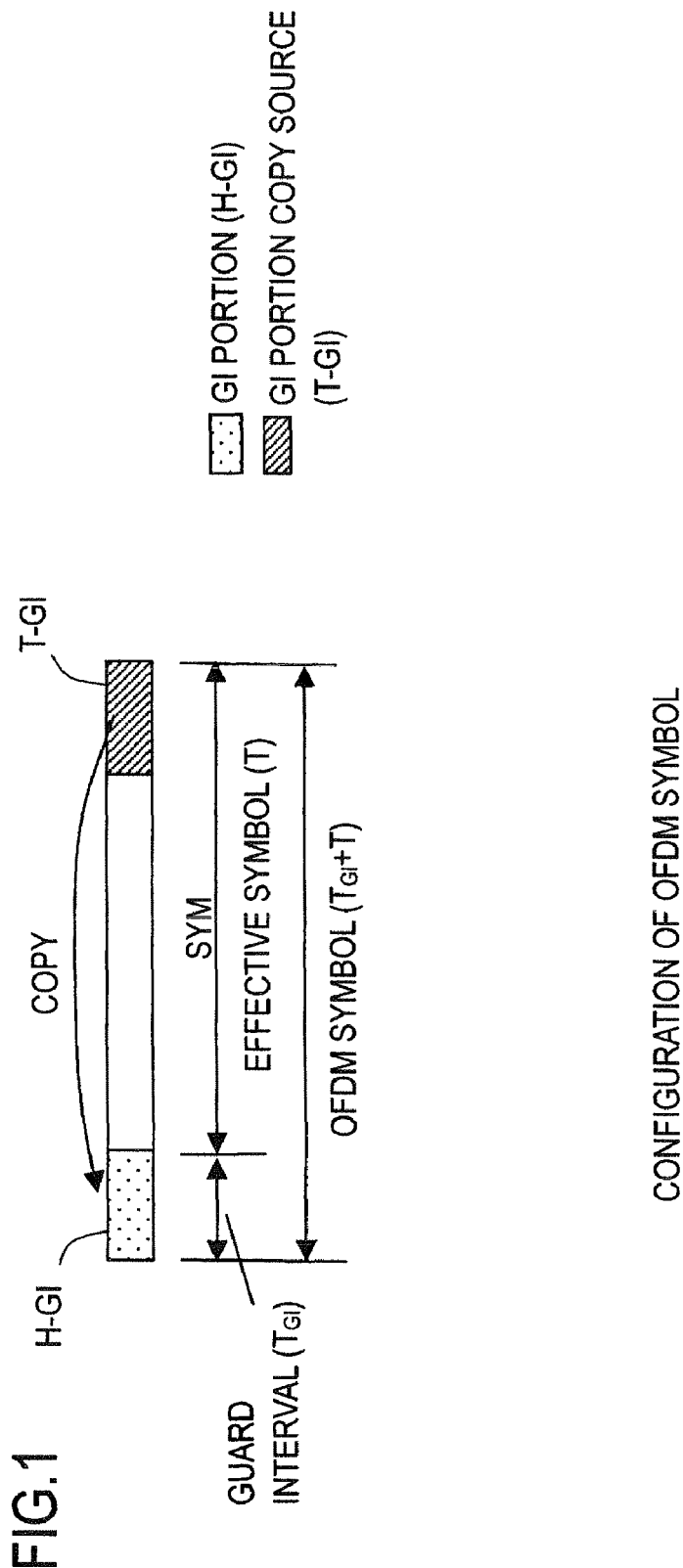
FIG. 1 depicts one OFDM transmission symbol.

FIG. 1 depicts one OFDM transmission symbol. An OFDM symbol comprises an effective symbol SYM, and a guard interval H-GI obtained by copying a portion of the signal T-GI at the back of the effective symbol SYM to the front of the effective symbol SYM. The time length of the OFDM symbol is the sum of the time T of the effective symbol SYM and the time TGI of the guard interval H-GI.

OFDM is a modulation system in which modulation of numerous mutually orthogonal subcarriers is performed by data for transmission, and these modulated waves are multiplexed and transmitted. In OFDM, by transmitting numerous subcarriers in parallel utilizing its orthogonality, transmission rates can be raised, and moreover the influence of frequency-selective fading can be reduced. And, as in FIG. 1, since a copy of the signal T-GI at the back of the effective symbol SYM is added to the front of the effective symbol SYM as a guard interval H-GI to form an OFDM symbol, demodulation processing can be performed, without the occurrence of intersymbol interference, to multipath reception signals with delay times equal to or less than the time TGI of the guard interval.

However, in environments of single-frequency network (SFN), which is a premise of current digital terrestrial broadcasting, if delay spreading exceeding the time TGI of such guard intervals occurs, reception performance is greatly degraded. For example, in the case of digital terrestrial broadcasting, when broadcast waves from an adjacent area are received, they may be received as interference waves causing intersymbol interference.

FIG. 2 explains intersymbol interference in multipath fading. In FIG. 2, reception signals from a base station BS arrive at a mobile station MS along three paths. Of the reception signals along the three paths, the main wave MW is the reception signal with the greatest power, and delayed waves d1 and d2, which are reflected by buildings or similar in the vicinity on paths different from the main wave MW, arrive at the mobile station MS. And, the delayed wave d1 is received delayed by a delay time Td1 with respect to the main wave MW, and the delayed wave d2 is received delayed by a delay time Td2.

As depicted in FIG. 2, since the delay time Td1 is within the time TGI of guard intervals in case of the delayed wave d1, the data of the adjacent symbol does not enter in the FFT window, and so intersymbol interference (ISI) does not occur. However, since the delay time Td2 exceeds the time TGI of the guard intervals in case of the delayed wave d2, the adjacent symbol #N−1 is included in the FFT window of the main wave MW, intersymbol interference occurs, and demodulation becomes difficult.

FIG. 3 explains an adaptive array antenna in spatial diversity. The adaptive array antenna is provided with a plurality of antennas separated spatially, for example by half-wavelengths, and by for example using variable attenuators and phase-shifters to cause coincidence of the phases of reception waves received by two antennas, the directions of the paths of the reception waves can be provided with directionality (beam steering); conversely, by causing the phases to be opposite, a null can be created in the direction of the path of a received wave (null steering).

Figure 3A:
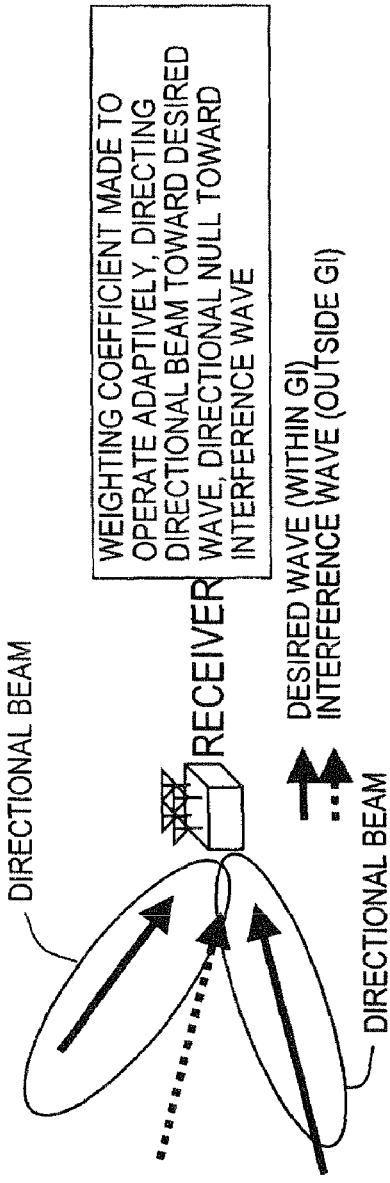
FIG. 3 explains an adaptive array antenna in spatial diversity.

As depicted in FIG. 3A, by directing the directional beam due to this beam steering toward the arrival angles of the main wave MW and delayed wave d1 of FIG. 2, the desired waves can be received, and by directing the direction of the directional null due to null steering toward the arrival angle of an interference wave, the interference wave can be attenuated. In the example of FIG. 3A, the arrival angles of the two desired waves are sufficiently distant from the arrival angle of the interference wave, so that the two can be separated with the beam resolution of the antenna. That is, by performing formation of a directional beam or null of the adaptive array antenna appropriately for each path, multipath diversity can be obtained, and interference waves can be eliminated.

Figure 3B:
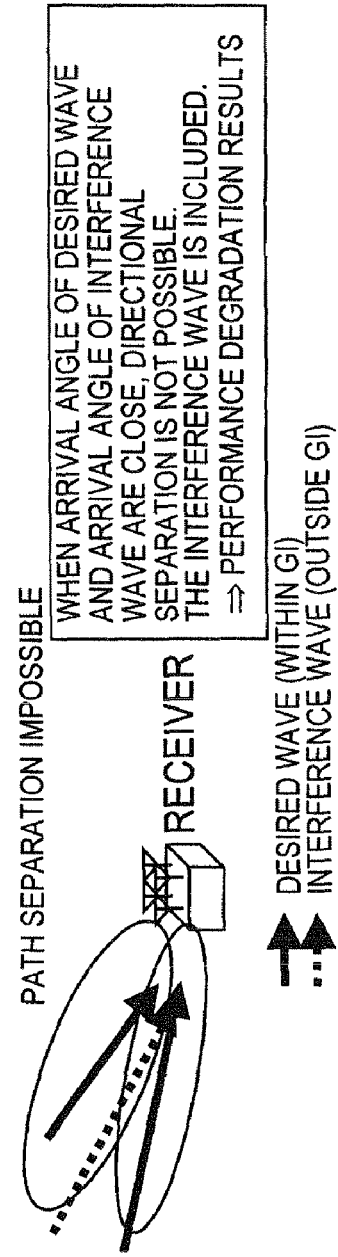

However, as in FIG. 3B, there are cases in which the arrival angle of a desired wave and the arrival angle of an interference wave are close, and it is not possible to separate these waves at the beam resolution of the antenna. In such cases in which an interference wave arrives at an angle which is closer than the beam resolution of the array antenna, the interference wave cannot be attenuated even using spatial diversity combining. The spatial resolution of the adaptive array antenna depends on the arrangement and number of antennas; the greater the number of antennas, the higher is the directional beam resolution, and the greater the effect in suppressing interference waves tends to be, but as the number of antennas increases the circuit scale grows, and there is a limit to the number of antennas.

And, in an adaptive array antenna, the degrees of freedom, which is the sum of the number of beam steering and null steering, depends on the number of antennas. When as stated above the number of antennas is limited, there is a limit to the degrees of freedom also. Hence when reception signals arrive on a number of paths which exceeds the degrees of freedom of the antennas, it is no longer possible to allocate either beam steering or null steering to the received waves for all the paths, and attenuation of interference waves becomes difficult.

Thus although multipath diversity by an adaptive array antenna is effective for eliminating interference waves, as explained above, there are also circumstances in which interference waves cannot be effectively eliminated. This embodiment enables effective elimination of interference waves even under such circumstances.

EMBODIMENTS

Figure 4:
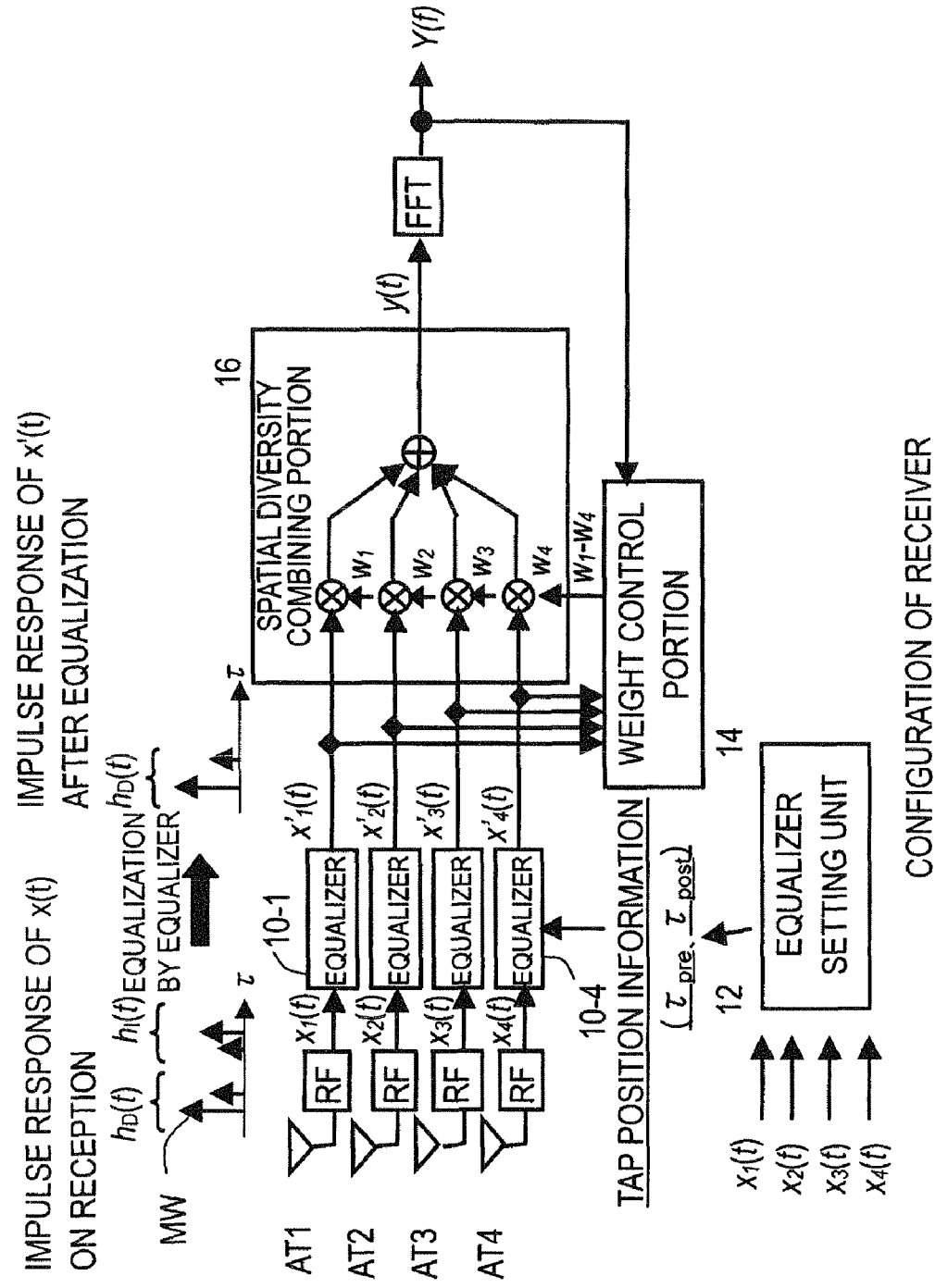
FIG. 4 depicts in summary the configuration of the receiver of this embodiment.

FIG. 4 depicts in summary the configuration of the receiver of this embodiment. This receiver has four antennas AT1 to AT4, and, for each antenna, a high-frequency circuit RF which down-converts the frequency of the received wave, and an adaptive equalizer 10-1 to 10-4 which attenuates those interference waves, among advanced waves and delayed waves with respect to the main wave due to multipath propagation, for which the delay time exceeds the guard interval time. Also, the receiver has a spatial diversity combining portion 16 which multiplies the output signals of the adaptive equalizers 10-1 to 10-4 by weighting coefficients w1 to w4 and adds the results, and a weight control portion 14 which generates the weighting coefficients w1 to w4 based on the output signals of the adaptive equalizing means. The output of the spatial diversity combining portion 16 is subjected to FFT processing to convert from time-domain signals y(t) to frequency-domain signals Y(f). FFT may also be provided between the adaptive equalizing means and the spatial diversity combining portion.

As depicted in FIG. 4, the impulse response of reception signals output from the high-frequency circuits RF has delayed waves (or advanced waves) with delay times from the main wave MW not exceeding the guard interval time TGI, and interference waves with delay times exceeding the guard interval time TGI. The main wave and delayed waves (or advanced waves) with delay times not exceeding the TGI are desired waves hD(t); on the other hand, delayed waves (or advanced waves) with delay times from the main wave exceeding the TGI are interference waves hI(t).

The equalizers 10-1 to 10-4 installed on each of the antennas AT1 to AT4 appropriately attenuate advanced waves or delayed waves corresponding to delay times ($\tau$pre, $\tau$post) set by the equalizer setting unit 12. Operation of the equalizer setting unit 12 is described in detail below, but an interference wave which cannot be attenuated by the spatial diversity combining portion 16 is selected, and by setting the delay times $\tau$pre, $\tau$post for this interference wave in all of the adaptive equalizers 10-1 to 10-4, the interference wave is equalized by the adaptive equalizers 10-1 to 10-4.

On the other hand, the spatial diversity combining portion 16 performs beam steering in the direction of the arrival angle of the desired waves to form a directional beam, performs null steering in the direction of the arrival angle of an interference angle which could not be eliminated even by the equalizers to form a directional null. To this end, the weight control portion 14 computes weighting coefficients w1 to w4 to form the beam steering and null steering, based on the output signals x1'(t) to x4'(t) of the adaptive equalizers. The computed directions are for example as described in S. Hara, M. Budsabathon and Y. Hara, "A pre-FFT OFDM adaptive antenna array with eigenvector combining", IEEE International Conference on Communications 2004, vol. 4, pp. 2412-2416, June 2004 and T. Uraguchi, N. Kikuma and N. Inagaki, "Application of DCMP adaptive array to OFDM-CDMA communication system", IEICE Transactions, B, Communications, 83-B(2), pp. 216-224, February 2000.

Further, when all interference waves are equalized (eliminated) by the adaptive equalizers 10-1 to 10-4, the spatial diversity combining portion 16 performs weight control of the maximum ratio combining and similar and combining processing, such that the received power of the desired waves is maximum.

The output signal y(t) of the spatial diversity combining portion 16 is converted by FFT from a time-domain signal into a frequency-domain signal Y(f). And, the frequency-domain signal Y(f) is input to an OFDM demodulation portion, not shown, and after transmission path assurance, error correction processing and similar, transmission data is extracted in the OFDM demodulation portion.

The receiver of this embodiment performs attenuation or elimination of interference waves caused by multipath fading through weight control in the spatial diversity combining portion 16 to the extent possible. However, when there is arrival on a path exceeding the degrees of freedom of the antennas, or when the arrival angle of an interference wave is too close to the arrival angle of a desired wave and similar with the antenna direction beam resolution being exceeded, the spatial diversity combining portion 16 alone cannot eliminate all interference waves. In such cases, the equalizer setting unit 12 decides interference waves which should be eliminated by the adaptive equalizers 10-1 to 10-4, sets the delay times for the interference waves in the adaptive equalizers, and causes the adaptive equalizers to eliminate the interference waves.

Figure 5:
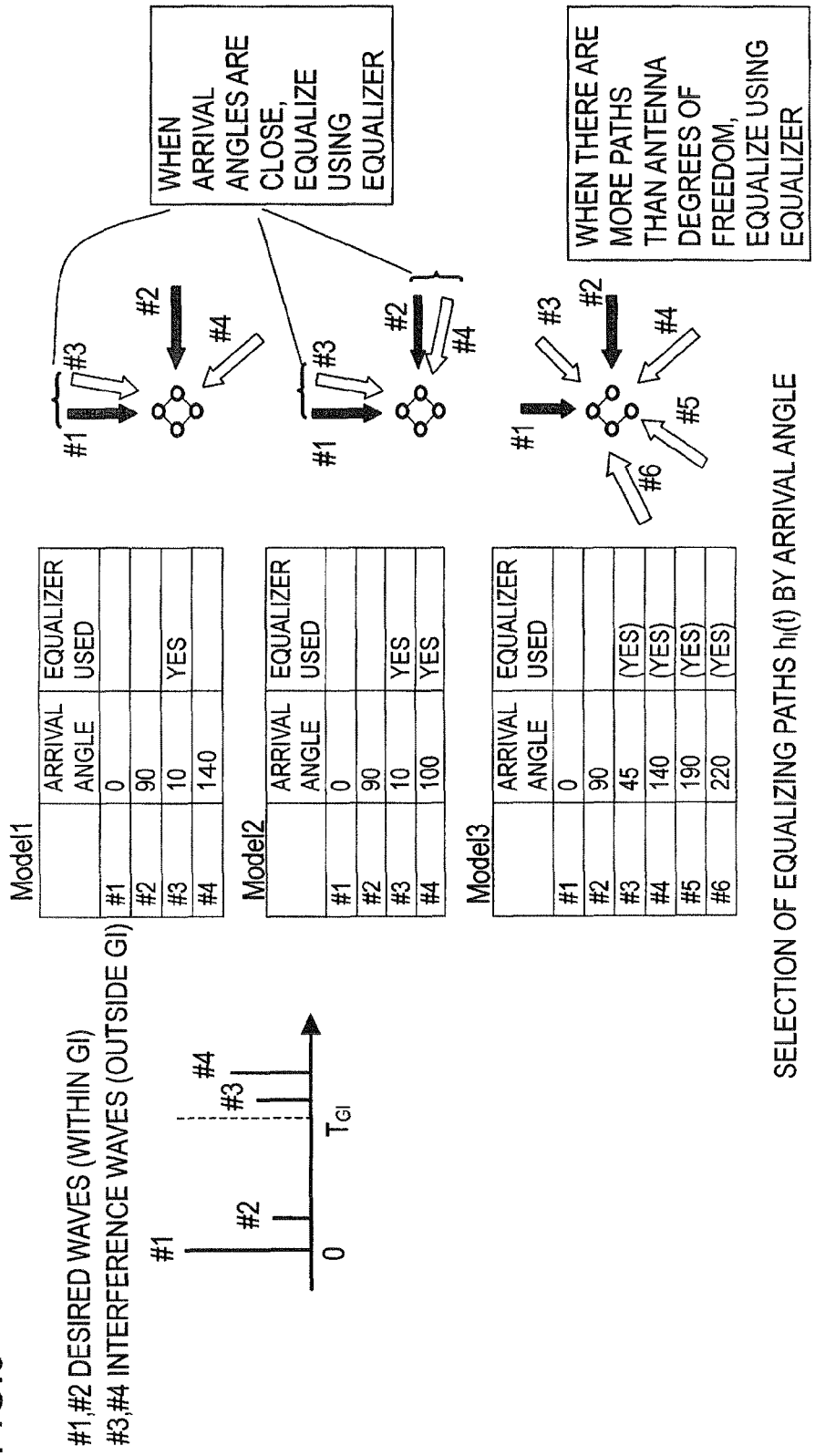
FIG. 5 is a drawing to explain the function of the equalizer setting unit in this embodiment.

FIG. 5 is a drawing to explain the function of the equalizer setting unit in this embodiment. In FIG. 5 are depicted a delayed wave #2 having a delay time with respect to the main wave #1 within the guard interval TGI, and delayed waves #3 and #4 with delay times exceeding the TGI. Also, in FIG. 5, models 1, 2 and 3 are depicted. This adaptive array antenna has four antennas, and is assumed to have four degrees of freedom.

In model 1, the desired wave #1 and interference wave #3 are received at arrival angles that are closer than the antenna directional beam resolution; on the other hand, the arrival angles of the desired wave #2 and interference wave #4 are not close together, and are also not close to the arrival angles of the desired wave #1 and interference wave #3. In such a case, equalizing by the adaptive equalizers 10-1 to 10-4 is performed for the interference wave #3 only.

To this end, the equalizer setting unit 12 has an arrival angle estimation portion, a delay amount profile estimation portion, and an equalizer setting control portion, and takes the autocorrelation and intercorrelation of the baseband reception signals $x1(t)$ to $x4(t)$ from the antennas which are the outputs of the high-frequency circuits RF, and from this correlation information estimates the arrival angles and delay amounts of the desired waves #1 and #2 and of the interference waves #3 and #4. And, the interference wave #3 is determined to be an interference wave to be equalized by adaptive equalizers, and the delay time of the interference wave #3 is set in the adaptive equalizers 10-1 to 10-4. That is, as depicted in the table for model 1, interference wave #3 is decided upon as having an arrival angle close to the arrival angle of desired wave #1, and the delay time thereof is set in all the adaptive equalizers. As a result, the interference wave #3 is equalized by the adaptive equalizers, and only the desired waves #1 and #2 and the interference wave #4 are input to the spatial diversity combining portion 16.

And, the spatial diversity combining portion 16 multiples weighting coefficients w1 to w4 controlled by the weight control portion 14 with the output signals $x1'(t)$ to $x4'(t)$ of each of the adaptive equalizers, and by adding the results, a directional null is applied to the interference wave #4, and directional beams are applied to the desired waves #1 and #2. As a result, the interference wave #4 is eliminated from the combined wave y(t), which includes only the desired waves #1 and #2. After FFT, the desired waves #1 and #2 are phase-matched and demodulated in the latter stage of the OFDM demodulation circuit.

Model 2 is an example in which the arrival angles of the desired wave #1 and interference wave #3 are close, and the arrival angles of the desired wave #2 and the interference wave #4 are also close. However, the arrival angles for the two sets are not close to each other. And, the number of paths is four, and does not exceed the four degrees of freedom of the antenna.

In this model 2, the adaptive array antenna cannot distinguish the interference waves #3 and #4 from the desired waves #1 and #2 respectively and attenuate them. Hence the equalizer setting unit 12 decides that the interference waves #3 and #4 are interference waves to be equalized by the adaptive equalizers, and sets the delay times of the interference waves #3 and #4 in the adaptive equalizers 10-1 to 10-4. As a result, the interference waves #3 and #4 are equalized by the adaptive equalizers, and only the desired waves #1 and #2 are input to the spatial diversity combining portion 16.

The weight control portion 14 sets weighting coefficients w1 to w4 such that directional beams are allocated to the desired waves #1 and #2, and the combined wave y(t) of the spatial diversity combining portion 16 includes only the desired waves #1 and #2.

Model 3 is an example in which the two desired waves #1 and #2 and the four interference waves #3 to #6 have arrival angles that are not close. That is, in this example the number of paths is six, and exceeds the four degrees of freedom of the antenna.

In this model 3, weighting coefficients can only be set so as to allocate directional beams to two desired waves and directional nulls to two interference waves in the spatial diversity combining portion 16. Hence the equalizer setting unit 12 sets two delay times such that two among the interference waves #3 to #6 can be equalized by the adaptive equalizers. And, the remaining interference waves are allocated directional nulls and removed by the spatial diversity combining portion 16.

Figure 6:
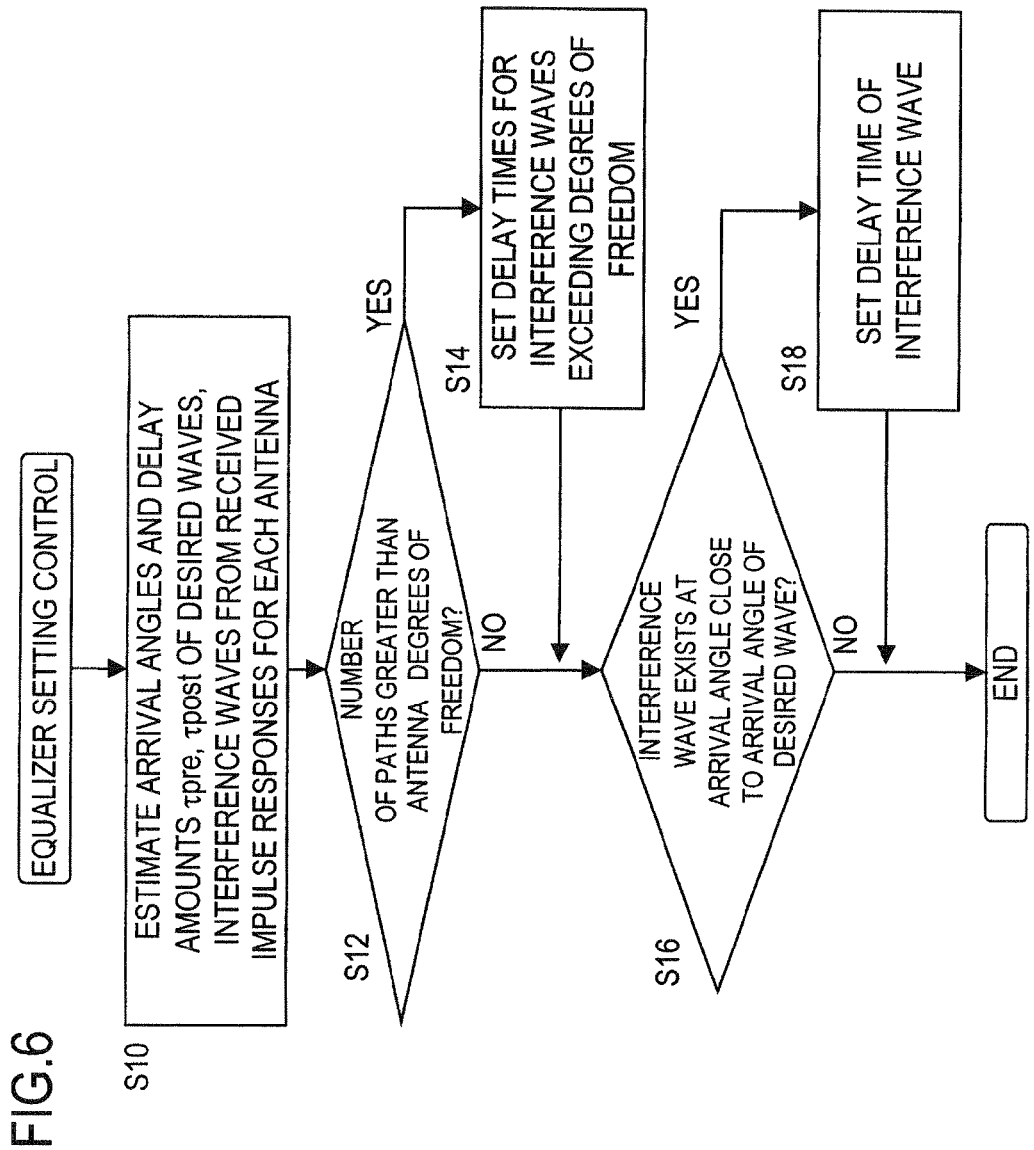
FIG. 6 is a flowchart of control of the equalizer setting unit 12.

FIG. 6 is a flowchart of control of the equalizer setting unit 12. As explained above, the equalizer setting unit 12 has an arrival angle estimation portion which input the output signals x1(t) to x4(t) of the high-frequency circuits RF and estimates arrival angles for each path, and a delay amount profile estimation portion which estimates the delay amount for each advanced wave and delayed wave, as well as an equalizer setting control portion which sets the delay amounts for interference waves to be equalized by the adaptive equalizers using these estimated arrival angles and delay amounts.

As depicted in FIG. 6, the equalizer setting unit 12 estimates the arrival angles and delay amounts $\tau_{pre}$ and $\tau_{post}$ of the desired waves and interference waves from the impulse responses received by each antenna (S10). These estimations are performed based on the output signals x1(t) to x4(t) of the high-frequency circuits RF. Estimation can be performed when the output signals have a known pilot signal. As the estimation method, a well-known technique can be used.

Or, to determine delay amounts for desired waves and interference waves, OFDM frequency-domain signals converted by FFT are demodulated, interpolation is performed from known pilot signals to estimate transmission path, and this is converted by IFFT to determine time-domain signal impulse responses (equivalent to the output of the high-frequency circuits RF), from which delay profiles can be estimated.

And, when the number of paths of arriving waves is larger than the antenna degrees of freedom (YES in S12), interference waves exceeding the degrees of freedom are decided, and the delay times of these interference waves are set in the adaptive equalizers 10-1 to 10-4 (S14). By this means, interference waves exceeding the degrees of freedom are attenuated by the adaptive equalizers.

And, when there exists an interference wave remaining within arrival angles close to the arrival angle of a desired wave (YES in S16), the delay time of this remaining interference wave is set in the adaptive equalizers (S18). By this means, interference waves which cannot be eliminated with the resolution of the antenna can be attenuated by the adaptive equalizers.

As a result, the output signals x1'(t) to x4'(t) of the adaptive equalizers include only the arrival waves of a number of paths not exceeding the antenna degrees of freedom, and moreover includes only desired waves and interference waves that can be distinguished at the antenna resolution. Hence by having the latter-stage weight control portion 14 set weighting coefficients w1 to w4 so as to allocate directional beams for the desired waves, and so as to allocate directional nulls for the interference waves, the spatial diversity combining portion 16 can eliminate interference waves and amplify desired waves.

In FIG. 6, when the arrival angles of desired waves and interference waves cannot be estimated, and only delay amounts can be estimated, for example the delay amounts of interference waves with higher power can be given priority when setting values in the adaptive equalizers. In particular, when the number of paths exceeds the antenna degrees of freedom, by equalizing high-power interference waves in the adaptive equalizers, even when for example interference waves having arrival angles closer to those of desired waves than the antenna resolution cannot be eliminated by the spatial diversity combining portion 16, the power of such interference waves is comparatively low, and so intersymbol interference can be held to a minimum.

First Embodiment

Figure 7:
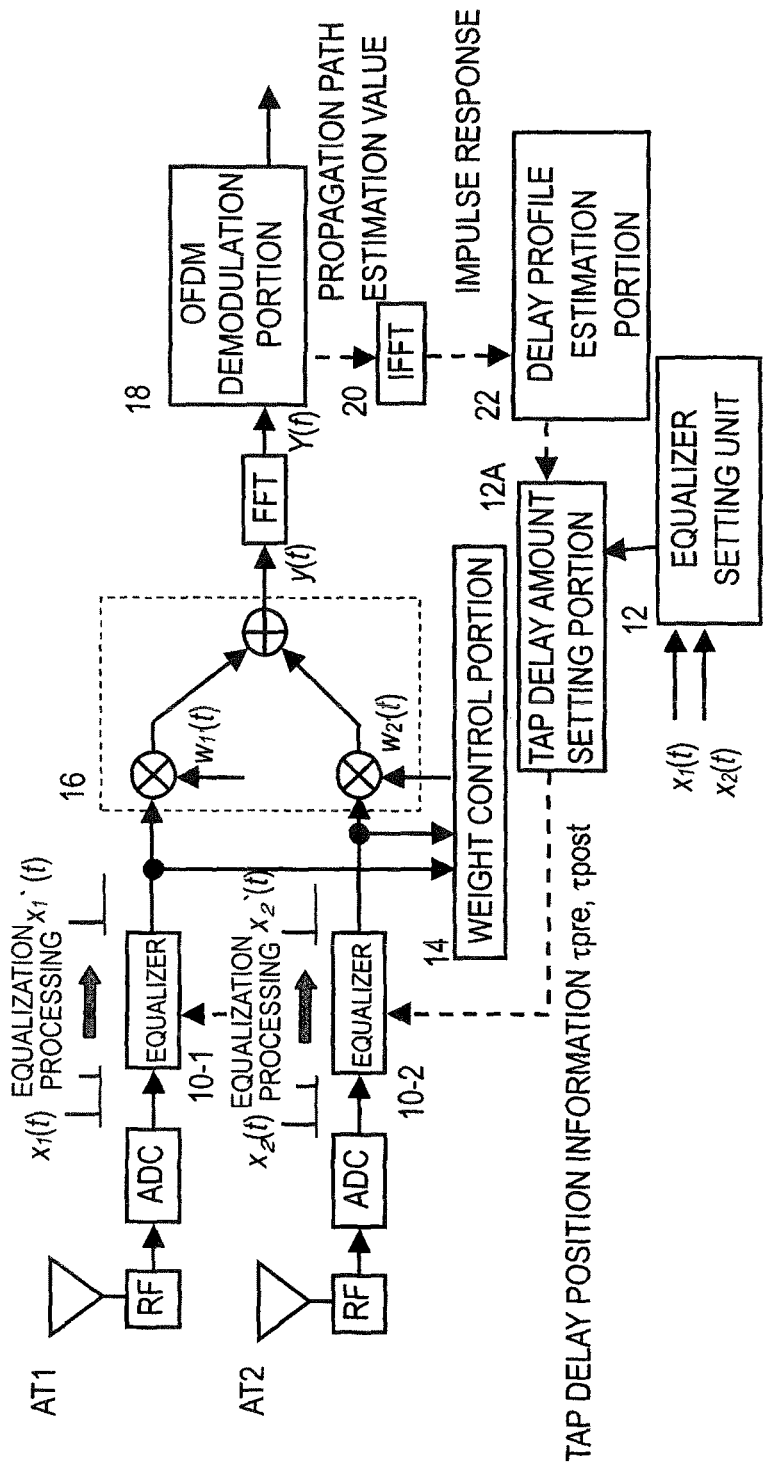
FIG. 7 depicts a configuration of the receiver of a first embodiment, which is a more specific configuration of the device of FIG. 4.

FIG. 7 depicts a configuration of the receiver of a first embodiment, which is a more specific configuration of the device of FIG. 4. In FIG. 7, due to space constraints, only two antennas AT1 and AT2 are depicted, but the antenna may be an adaptive array antenna having four antennas, as in FIG. 4, or a plurality of antennas equal to or greater than four. In each of the antennas AT1, AT2 are provided high-frequency reception circuits RF, analog/digital conversion circuits ADC, and adaptive equalizers 10-1, 10-2. And, delay amounts $\tau_{pre}$ and $\tau_{post}$ are set as TAP delay position information in the adaptive equalizers 10-1, 10-2 by the TAP delay amount setting portion 12A. This TAP delay amount setting portion 12A is provided with delay information for interference waves to be equalized, decided in advance by the equalizer setting unit 12 using the above-described algorithm. By this means, interference waves are equalized and attenuated from the output signals x1'(t), x2'(t) of the adaptive equalizers. In particular, even when correlation between antennas is weak, the adaptive equalizers can each effectively equalize interference waves.

And, by having the weight control portion 14 set weighting coefficients so as to direct directional beams toward desired waves and direct directional nulls toward interference waves, interference waves are eliminated in the spatial diversity combining portion 16. The output of the spatial diversity combining portion 16 is converted by FFT from OFDM time-domain signals y(t) to OFDM frequency-domain signals Y(f), and in the OFDM demodulation portion 18 each of the subcarriers is demodulated and reception data is extracted.

In the OFDM demodulation portion 18, pilot signals included in received waves are demodulated, and by interpolating between pilot signals, transmission path estimate values can be obtained. A transmission path estimate value is the reception level corresponding to a frequency, and from this the distortion or similar occurring on a transmission path can be estimated. Hence as indicated by the dashed line in FIG. 7, through converting the transmission path estimate value by the IFFT 20, the impulse response (equivalent to x1(*t*), x2(*t*)), which is a time-domain signal, can be obtained. And, the delay profile estimation portion 22 can estimate the delay amounts of interference waves from the impulse response. Utilizing the interference wave delay amount, the TAP delay amount estimation portion 12A can for example set the delay amount for a high-power interference wave in the adaptive equalizers, and so can equalize this interference wave. In this case, the high-power interference wave is selected as an interference wave for adaptive equalization, regardless of the arrival angle. The delay amount of an interference wave for equalization may be selected and set as described above regardless of the above-described equalizer setting unit 12.

It is preferable that the adaptive equalizers 10-1, 10-2 of FIG. 7 be able to equalize both advanced waves advanced with respect to, and delayed waves delayed with respect to, the main wave with highest power. In particular, if interference waves (advanced waves or delayed waves) with delay amounts exceeding the guard interval time can be equalized, intersymbol interference can be avoided.

Figure 8:
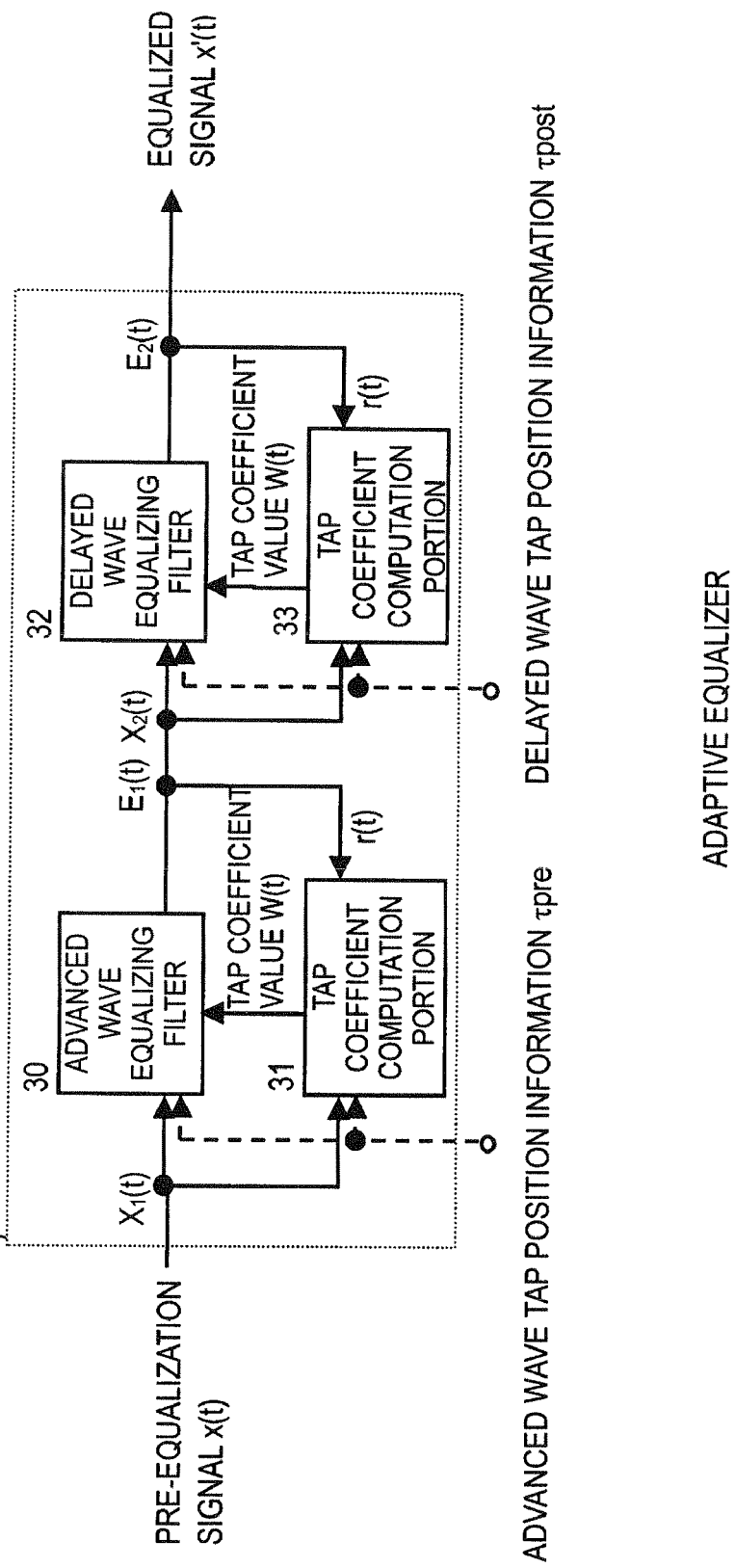
FIG. 8 depicts the configuration of an adaptive equalizer.

FIG. 8 depicts the configuration of an adaptive equalizer. The adaptive equalizer 10 has an advanced wave equalizing filter 30 which equalizes advanced waves, a TAP coefficient computation portion 31 which imparts to the filter 30 TAP coefficients W(t), a delayed wave equalizing filter 32 which equalizes delayed waves, and a TAP coefficient computation portion 33 which imparts to the filter 32 TAP coefficients W(t). And, advanced wave TAP position information τpre which is a delay amount for an advanced wave is set in the advanced wave equalizing filter 30 and the TAP coefficient computation portion 31, and delayed wave TAP position information τpost is similarly set in the delayed wave equalizing filter 32 and TAP coefficient computation portion 33.

By this means, in a pre-equalization signal X1(*t*), an interference wave which is an advanced wave having a preset delay amount is equalized by the advanced wave equalizing filter 30, and a signal E1(*t*)=X2(*t*) is output. And, in this signal X2(*t*), an interference wave which is a delayed wave having a preset delay amount is equalized by the delayed wave equalizing filter 32, and a signal E2(*t*) is output.

Figure 9:
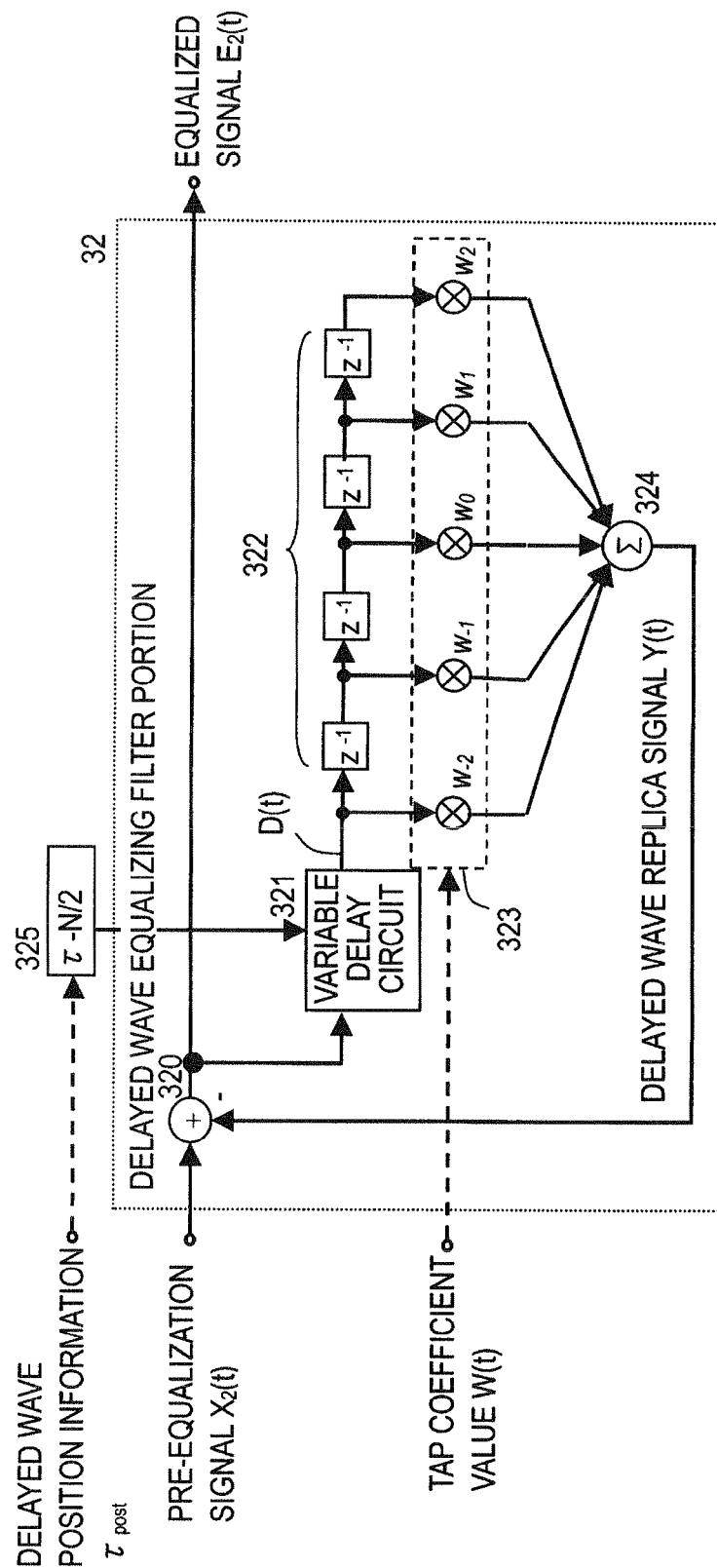
FIG. 9 depicts the configuration of the delayed wave equalizing filter 32.
Figure 10:
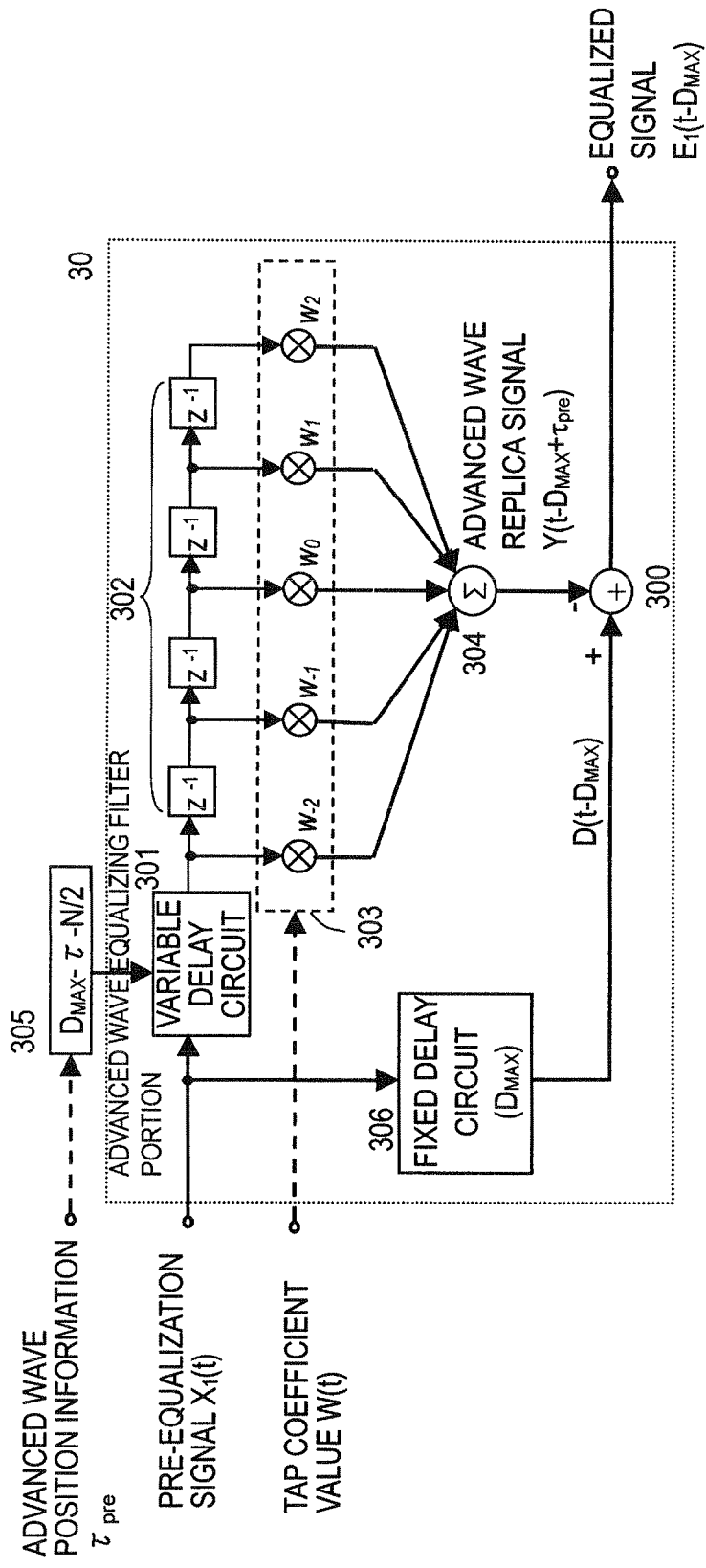
FIG. 10 depicts the configuration of the advanced wave equalizing filter 30.
Figure 11:
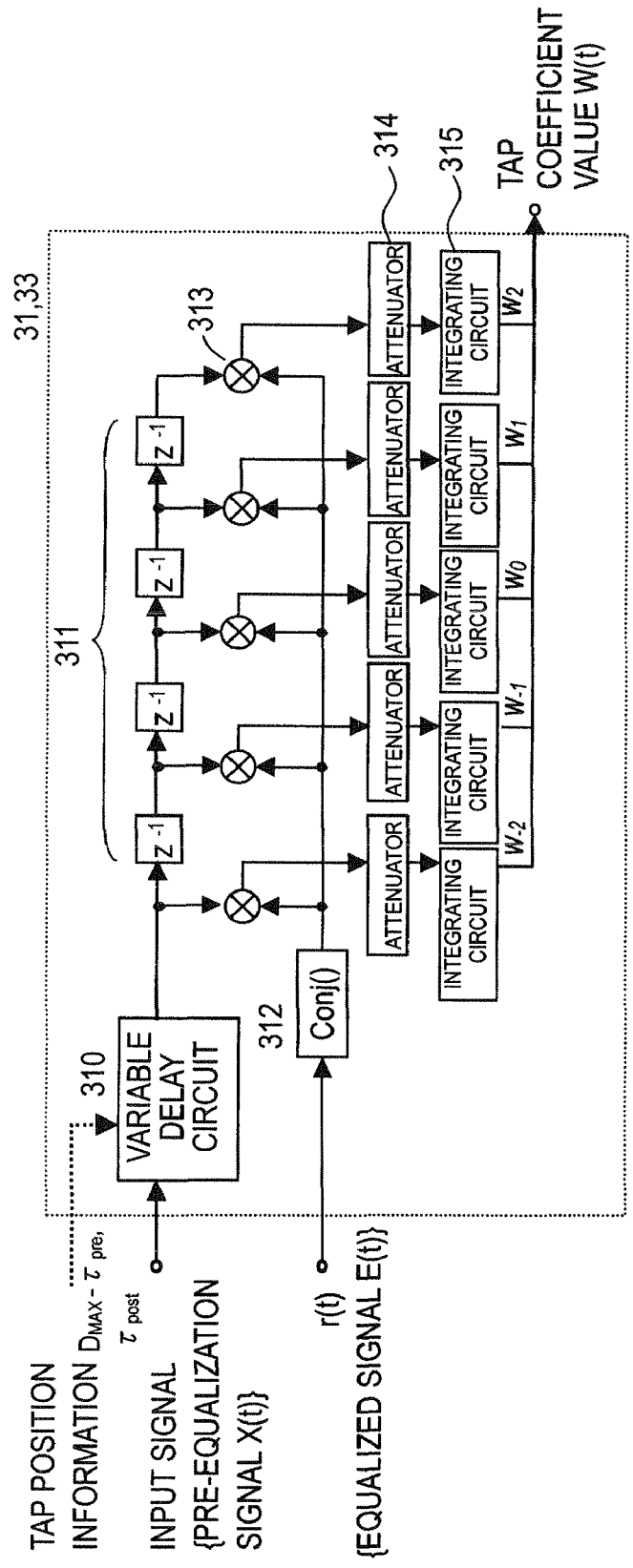
FIG. 11 depicts the configuration of the coefficient computation portions 33, 31.

FIG. 9 depicts the configuration of the delayed wave equalizing filter 32. FIG. 10 depicts the configuration of the advanced wave equalizing filter 30. And, FIG. 11 depicts the configuration of the coefficient computation portions 33, 31. The configurations of the coefficient computation portions 31, 33 are equivalent, with only the input signals different. Below, operation of these filters is explained in order.

The delayed wave equalizing filter 32 of FIG. 9 generates a delayed wave replica signal Y(t) from a pre-equalization signal X2(*t*), computes X2(*t*)−Y(t) using a subtractor 320, and eliminates a delayed wave existing in the pre-equalization signal X2(*t*). The delayed wave position information τpost, which is the delay amount of the delayed wave with respect to the main wave, is set in a variable delay amount setting register 325. And, the replica signal generation unit is formed by the variable delay circuit 321, shift register 322 having four delay circuits, multiplier 323 which multiplies five tap signals by TAP coefficient values W(t), and adder 324 which accumulates multiplication results. A delay amount (τpost−N/2) equal to the delay amount τpost minus the delay time up to the center tap N/2 of the shift register 322 is set in the variable delay amount setting portion 325.

The delayed wave equalizing filter 32 has a feedback system IIR (Infinite Impulse Response) configuration, and as explained below, the replica signal generation unit generates a replica signal of the delayed wave from the main wave MW, further generates a replica signal of the delayed wave from this replica signal, and continues this infinitely.

Figure 12:
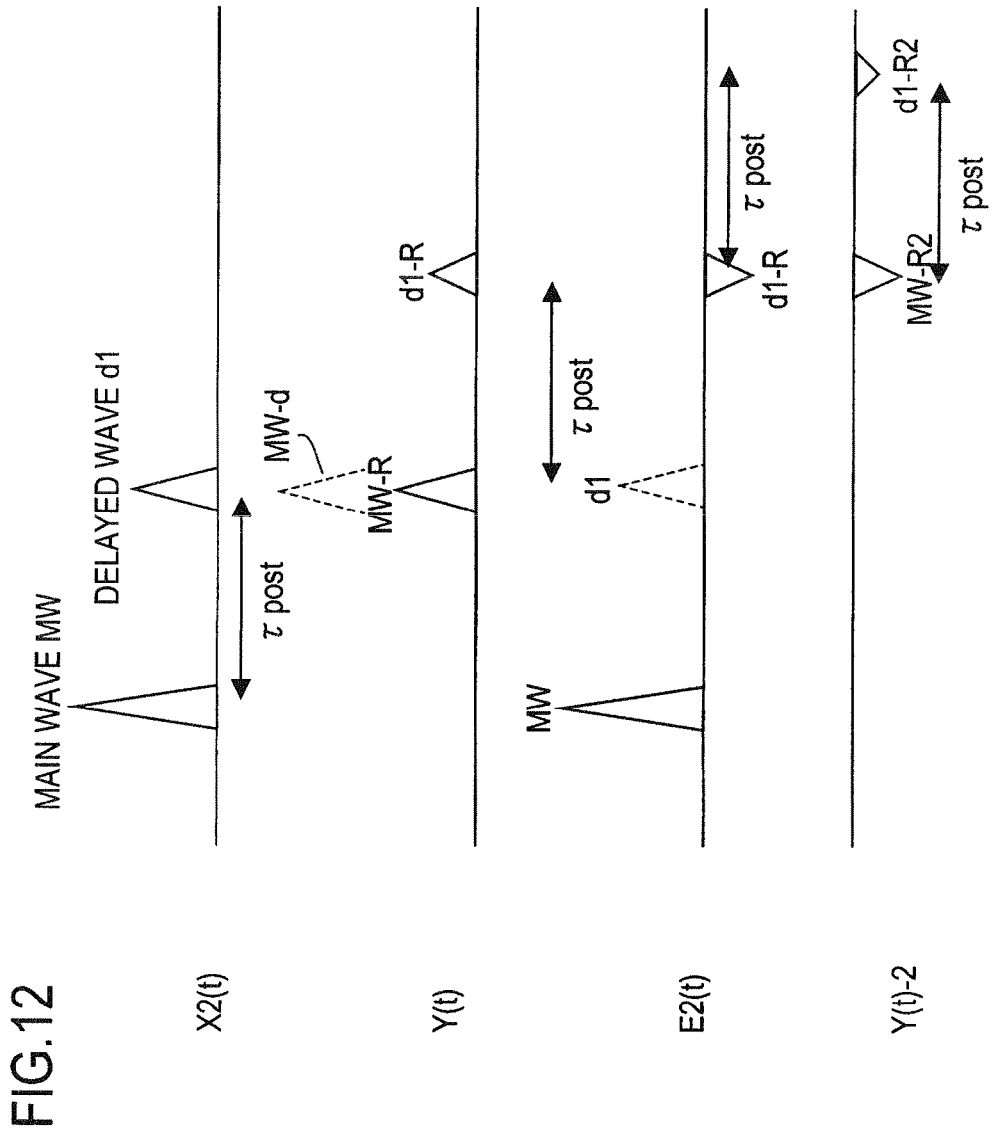
FIG. 12 explains operation of the delayed wave equalizing filter.

FIG. 12 explains operation of the delayed wave equalizing filter. A pre-equalization signal X2(*t*) includes the main wave MW with highest power, and a delayed wave d1 delayed by a delay time τpost therefrom. When this delayed wave d1 is an interference wave, it is selected as a delayed wave to be equalized.

First, the pre-equalization signal X2(*t*) is delayed by a delay amount (τpost−N/2) by the variable delay circuit 321, and is input to the shift register 322. This number of taps N corresponds for example to a prescribed time width of for example the main wave MW of the impulse response. Hence the delay time of the center tap coincides with τpost. And, the delayed pre-equalization signal X2(*t*) is multiplied by TAP coefficient values W(t) by the multiplier 323, and is combined by the adder 324 to generate a delayed wave replica signal Y(t).

As depicted in FIG. 12, this delayed wave replica signal Y(t) has two signals, MW-R and d1-R, generated by delaying by τpost and by multiplying the main wave MW and the delayed wave d1 of the pre-equalization signal X2(*t*) by the TAP coefficient. Here, the MW-R of the replica signal Y(t) and the delayed wave d1 have the same phase and the same amplitude, so that by using the subtractor 320 to subtract the replica signal Y(t) from the pre-equalization signal X2(*t*), the delayed wave d1 can be eliminated. The equalized signal E2(*t*) after subtraction processing, as depicted in FIG. 12, comprises the main wave MW and the signal d1-R delayed by 2τpost from the main wave.

However, the replica signal Y(t) subtracted by the subtractor 320 is used to generate a second-order replica signal Y(t)−2 having replica signals MW-R2, d1-R2 by means of feedback processing of the replica generation unit, and by subtracting this replica signal Y(t)−2, the signal d1-R which had been included in the equalized signal E2(*t*) is eliminated.

In this way, by infinitely repeating the generation and subtraction of replica signals, only the main wave MW remains in the equalized signal E2(*t*).

In order that there be a plurality of delayed waves to be equalized, pluralities of the variable delay amount setting register 325, and of the variable delay circuit 321, shift register 322, multiplier 323, and integrator 324 forming the replica signal generation unit, are provided in parallel, in the number of the delayed waves to be equalized. And, the replica signal generation units provided in parallel each generate a replica signal to eliminate a delayed wave to be equalized, and the replica signals generated from the pre-equalization signal X2(*t*) are each subtracted by the subtractor 320.

The advanced wave equalizing filter 30 of FIG. 10 generates an advanced wave replica signal Y(t−DMAX) from a signal obtained by delaying the pre-equalization signal X1(*t*) by a time (DMAX−τ−N/2) using the variable delay circuit 301; on the other hand, the pre-equalization signal X1(*t*) is delayed by DMAX by a fixed delay circuit 306 to generate a delayed signal D(t−DMAX), and D(t−DMAX)−Y(t−DMAX) is computed by a subtractor 300 to eliminate an advanced wave A1 existing in the delayed signal D(t−DMAX) of the pre-equalization signal X1(*t*). The advanced wave position information τpre, which is the delay amount of the advanced wave with respect to the main wave, is set in a variable delay setting unit 305. And, the replica signal generation unit comprises the variable delay circuit 301, a shift register 302 having four delay circuits, a multiplier 303 which multiplies five tap signals by TAP coefficient values W(t), and an adder 304 which adds multiplication results. In the variable delay amount setting portion 305, the delay amount (DMAX−τpre−N/2) obtained by subtracting the advanced wave position information τpre from the fixed delay amount DMAX, and further subtracting the delay time N/2 to the center tap of the shift register 302, is set.

The advanced wave equalizing filter 30 has a feed-forward system FIR (Finite Impulse Response) configuration, and as explained below, the replica signal generation unit generates an advanced wave replica signal Y(t−DMAX+τpre) obtained by delaying the main wave MW by DMAX−τpre, and subtracts this replica signal Y(t−DMAX+τpre) from a delayed signal D(t−DMAX) obtained by delaying the pre-equalization signal X1($t$) by DMAX. In FIR, only an impulse response of finite length can be realized, and so an advanced wave component cannot be completely equalized, as in the case of IIR in a delayed wave equalizer. Therefore, the equalized signal E1($t$−DMAX) includes A1-R.

Figure 13:
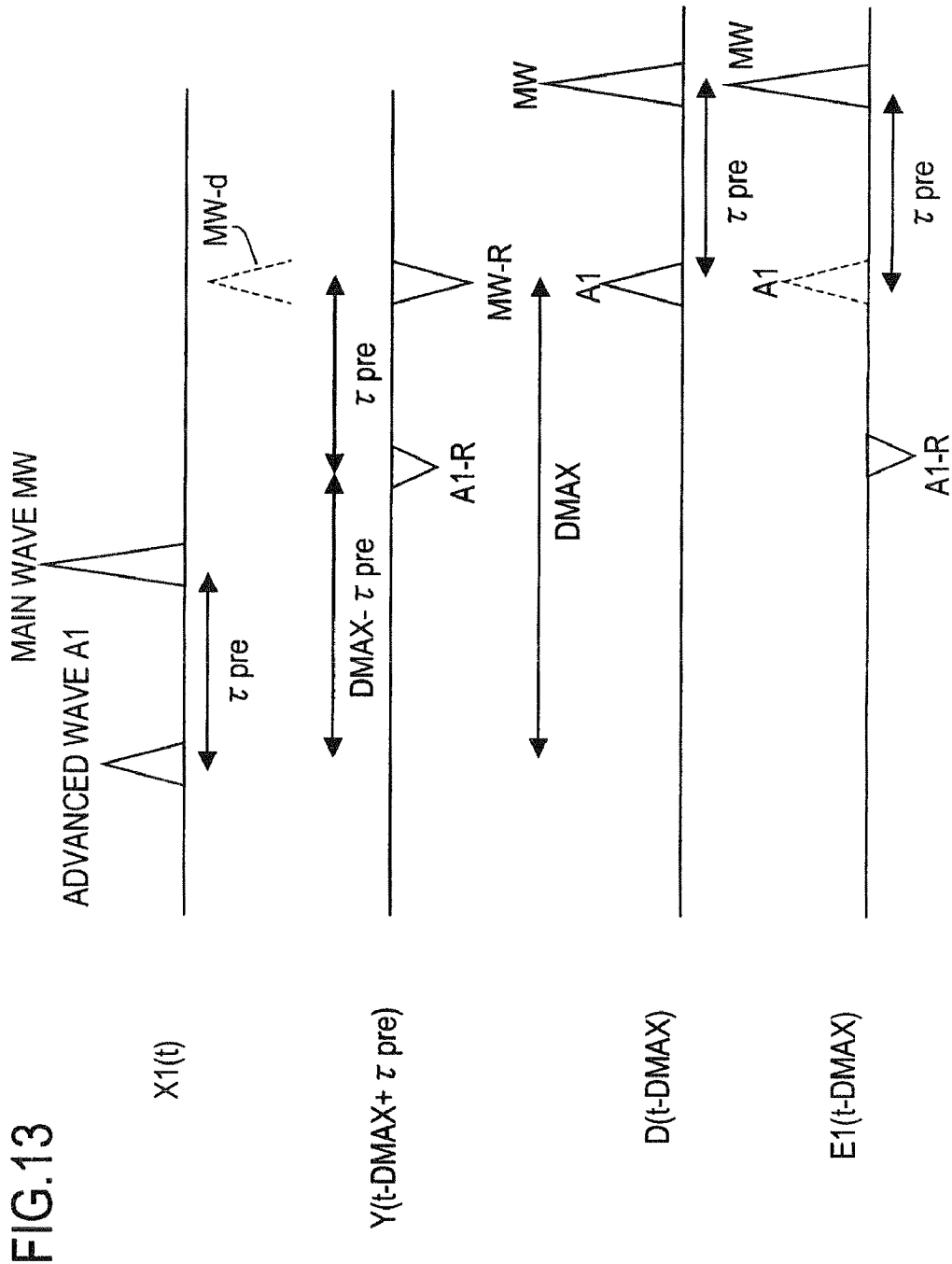
FIG. 13 explains operation of an advanced wave equalizing filter.

FIG. 13 explains operation of an advanced wave equalizing filter. Suppose that a pre-equalization signal X1($t$) includes a main wave MW with the highest power, and an advanced wave A1 advanced by a delay time τpre therefrom. When this advanced wave A1 is an interference wave, it is selected as an advanced wave to be equalized.

First, the maximum delay amount DMAX is set to the maximum value of the delay amount τpre which can be taken by the advanced wave A1. That is, DMAX>τpre. And, the pre-equalization signal X1($t$) includes the advanced wave A1 and a main wave MW. The replica signal generation unit comprises a variable delay circuit 301, shift register 302, multiplier 303, and adder 304. The pre-equalization signal X1($t$) is delayed by (DMAX−τpre) by the variable delay circuit 301 and is input to the shift register 302. The signals of the five taps of the shift register 302 are multiplied by TAP coefficient values W(t) by the multiplier 303, and are combined. By this means, the main wave MW and advance wave A1 which were included in the pre-equalization signal X1($t$) are each delayed by DMAX−τpre, and an advanced wave replica signal Y(t−DMAX+τpre), having signals A1-R and MW-R waveform-shaped by the TAP coefficient values, is generated.

On the other hand, the fixed delay circuit 306 delays the pre-equalization signal X2($t$) by DMAX, and generates a delayed signal D(t−DMAX). Here, the advanced wave A1 of this delayed signal D(t−DMAX) and the MW-R of the replica signal Y(t−DMAX) occur at the same time, so that by setting TAP coefficient values such that the MW-R is the same phase and amplitude as the advance wave A1, the advanced wave A1 is subtracted and eliminated from the replica signal MW-R by the subtractor 300. However, the replica signal A1-R generated from the advanced wave A1 in the advanced wave replica signal Y(t−DMAX+τpre) is also subtracted by the subtractor 300, and so remains included in the equalized signal E1($t$−DMAX). Hence the main wave MW and replica signal A1-R are included in the equalized signal E1($t$−DMAX), and the replica signal A1-R is not eliminated.

In order to equalize a plurality of advanced waves, pluralities of the variable delay amount setting register 305, and of the variable delay circuit 301, shift register 302, multiplier 303, and integrator 304 forming the replica signal generation unit, are provided in parallel, in the number of the advanced waves to be equalized. And, the replica signal generation units provided in parallel each generate a replica signal to eliminate an advanced wave to be equalized, and subtractor 300 may be used to subtract the generated replica signals from the delayed signal D(t−DMAX) obtained by delaying the pre-equalization signal X1($t$). In this case, the maximum delay amount DMAX is set to the maximum of the delay times of all the advanced waves.

The coefficient computation portion 31 (33) of FIG. 11 has a variable delay circuit 310 which delays the pre-equalization signal X(t) by a variable delay amount (DMAX-τpre for an advanced wave, τpost for a delayed wave); a shift register 311; a complex conjugate generation circuit 312 which generates the complex conjugate of the equalized signal E(t); five multipliers 313; five attenuators 314; and five integrators 315. In this coefficient computation, a LMS (Least Mean Square) algorithm based on a minimum mean squared error (MMSE) is employed, and TAP coefficient values W(t) are generated by the processing described below.

After the desired wave of the input signal X(t) and the timing of the delayed wave (advanced wave) of a reference signal Y(t) are synchronized by the variable delay circuit 310, multiplication is performed by a multiplier 313, attenuation by a fixed amount is performed by an attenuator 314, integration is performed by an integrating circuit 315, and a TAP coefficient w(t) is updated. Equations for this processing may be written as depicted below.

Case of an advanced wave: $W(t)=W(t-\Delta t)+\beta X(t-\tau pre)*Y(t)$

Case of a delayed wave: $W(t)=W(t-\Delta t)+\beta X(t+\tau post)*Y(t)$

Here, β is an attenuation amount. The above equations are LMS (Least Mean Square) algorithms based on MMSE, and by updating W(t) according to the above equations, the interference components of Y(t) can be gradually reduced.

In the coefficient computation portion 31 (33), in the case of a delayed wave equalizing filter the delay amount (τpost−N/2) is set in the variable delay circuit 310, and the pre-equalization signal X(t) is delayed. Further, the complex conjugate signal of the equalized signal E(t) and the delayed pre-equalization signal X(t) of the shift register 311 are multiplied by the multiplier 313 to determine the correlation value. And, in the attenuator 314, the correlation value and the step width, attenuation amount β are multiplied, and the multiplication result is output to the integrating circuit 315. In the integrating circuit 315, by integrating multiplication results, the TAP coefficient values W(t) are generated. Divergence of coefficients can be avoided by making the step width in the attenuator 314 as small as possible, but a smaller step results in longer time for convergence of the coefficient.

In the integrating circuit 315, the TAP coefficient values W(t) are generated in the direction which cancels the pre-equalization signal X(t) and the correlation value of the pre-equalization signal X(t). For example, the delayed signal of this pre-equalization signal X(t) is indicated by the dashed line MW-d in FIG. 12. And, the delayed wave signal d1 not yet equalized in the equalized signal E(t) is also indicated by a dashed line in FIG. 12. That is, in the coefficient computation portion 33, the correlation value between the delayed main wave MW-d and the delayed wave signal d1 which is not yet equalized is taken, the attenuated correlation value is integrated by the integrating circuit 315, and TAP coefficients are formed such that the delayed wave signal d1 which is not yet equalized becomes zero. When the not-yet-equalized delayed wave signal d1 becomes zero, the correlation value also becomes zero, and the TAP coefficients converge on ideal values. Hence in order to form ideal TAP coefficients, a fixed amount of time is required.

In the coefficient computation portion 31 (33), in the case of an advanced wave equalizing filter the delay amount (DMAX−τpre−N/2) is set in the variable delay circuit 310, and the pre-equalization signal X(t) is delayed. Further, the complex conjugate signal of the equalized signal E(t) and the delayed pre-equalization signal X(t) of the shift register 311 are multiplied by the multiplier 313 to determine the correlation value. And, the correlation value attenuated a fixed amount by the attenuator 314 is accumulated in the integrating circuit 315.

The delayed signal of this pre-equalization signal X(t) is indicated by the dashed line MW-d in FIG. 13. Further, the advanced wave signal A1 not yet equalized in the equalized signal E(t−DMAX) is also indicated by a dashed line in FIG. 13. That is, in the coefficient computation portion 31, the correlation value of the delayed main wave MW-d and the delayed wave signal A1 not yet equalized is taken, the attenuated correlation value is integrated by the integrating circuit 315, and TAP coefficients are formed such that the not-yet-equalized advanced wave signal A1 becomes zero. When the not-yet-equalized advanced wave signal A1 becomes zero, the correlation value also becomes zero, and the TAP coefficients converge on ideal values. Similarly, in order to form ideal TAP coefficients, a fixed amount of time is required.

As explained above, when the advanced wave equalizing filter 30 or delayed wave equalizing filter 32 equalize a plurality of advanced waves or delayed waves, as explained above a plurality of replica generation units are provided in parallel, so that a corresponding plurality of coefficient computation portions are also provided, and TAP coefficients are provided to the respective corresponding replica generation units.

Figure 14:
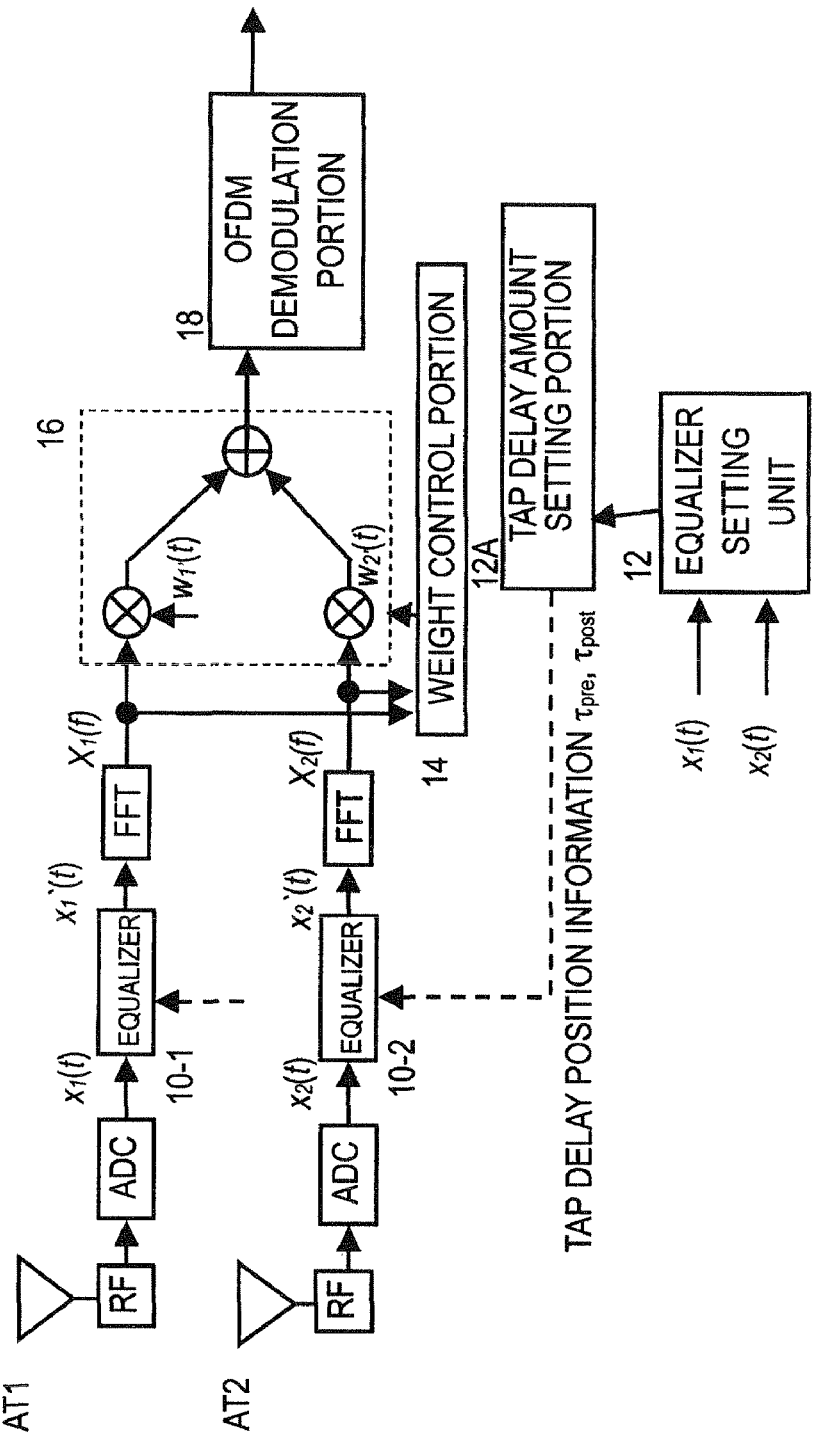
FIG. 14 depicts the configuration of a modified example of the receiver in the first embodiment.

FIG. 14 depicts the configuration of a modified example of the receiver in the first embodiment. This modified example differs from the configuration of FIG. 7, in that the OFDM time-domain signals x1'(t), x2'(t) of the equalizers 10-1, 10-2 are converted into OFDM frequency-domain signals X1(f), X2(f) by FFT, and the OFDM frequency-domain signals X1(f), X2(f) are combined based on weighting coefficients in the spatial diversity combining portion 16. Otherwise the configuration is similar to that of FIG. 7.

Second Embodiment

Figure 15:
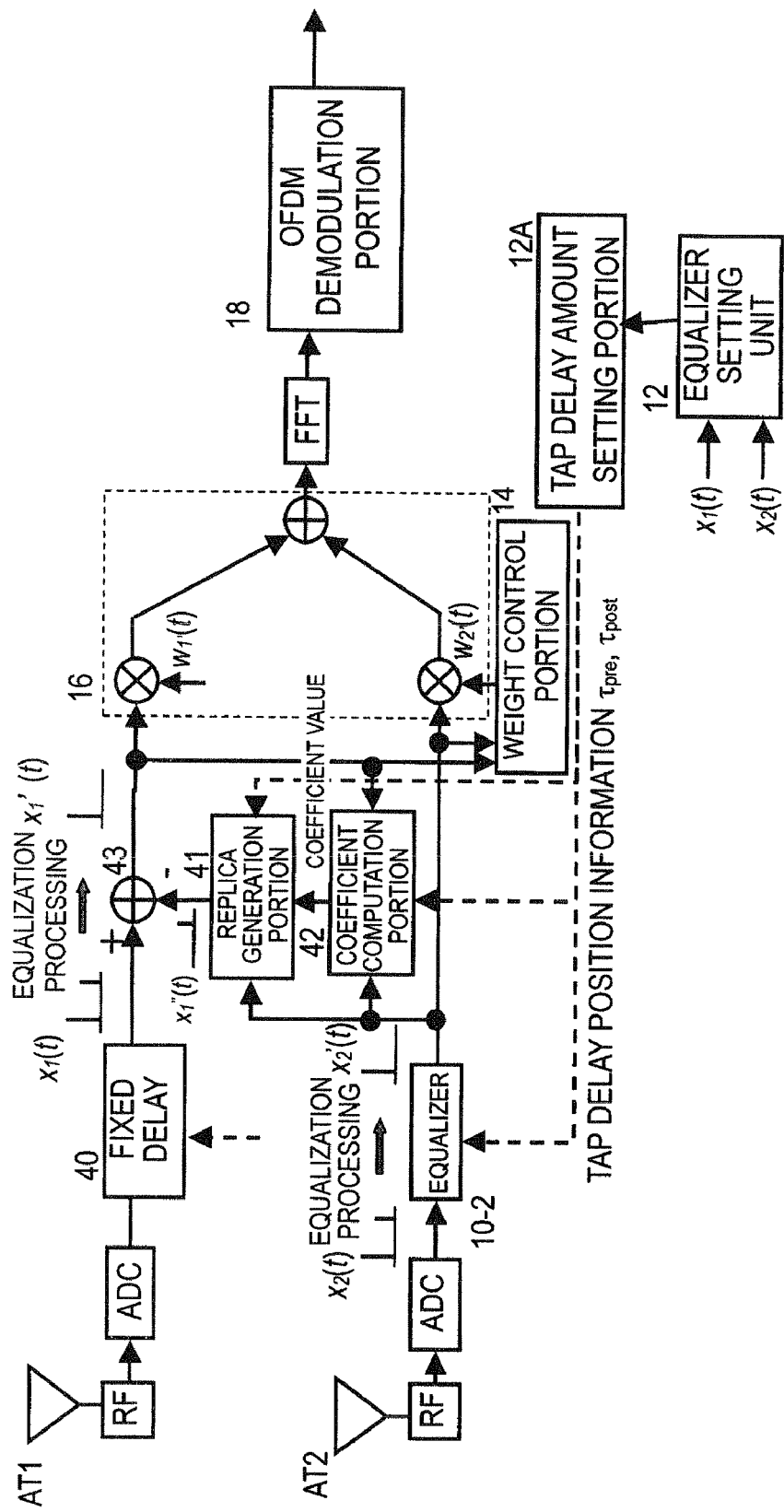
FIG. 15 depicts the configuration of the receiver of a second embodiment.

FIG. 15 depicts the configuration of the receiver of a second embodiment. This receiver is provided with a high-frequency circuit RF and an analog/digital converter ADC for each of two antennas AT1, AT2. And, the adaptive equalizer 10-2 of FIG. 8 is provided on the side of the antenna AT2. On the other hand, a fixed delay circuit 40 and a subtractor 43 are provided on the side of the antenna AT1. And, a replica generation portion 41 which generates a replica signal x1"(t) from the output signal x2'(t) of the adaptive equalizer 10-2 on the side of the antenna AT2 is provided; the replica signal x1"(t) generated thereby is subtracted from the reception signal x1(t) on the side of the antenna AT1 by the subtractor 43, to equalize the interference wave. To this end, a coefficient computation portion 42 is provided which computes coefficient values from the output signal x2'(t) of the adaptive equalizer 10-2 and the output signal x1'(t) of the subtractor 43 and provides it to the replica generation portion.

That is, an adaptive equalizer is effectively formed by the fixed delay circuit 40, subtractor 43, replica generation portion 41, and coefficient computation portion 42. And, signals x1'(t) and x2'(t) which have been subjected to equalization processing on the respective sides of the antennas AT1 and AT2 are combined by the spatial diversity combining portion 16.

Otherwise the configuration of the equalizer setting unit 12, TAP delay amount setting portion 12A, FFT, and OFDM demodulation portion are the same as in FIG. 7.

In the receiver of FIG. 15, a configuration is depicted to equalize either delayed interference waves or advanced interference waves on the side of the antenna AT1. If the adaptive equalizer 10-2 equalizes both advanced waves and delayed waves, then as can be understood from FIG. 10, the output signal x2'(t) of the adaptive equalizer 10-2 is already delayed by DMAX. Hence when eliminating an interference wave delayed on the side of the antenna AT1, delaying by DMAX must also be performed by the fixed delay circuit 40. And, the replica generation portion 41 generates a delayed wave replica signal x1"(t) obtained by delaying the signal x2'(t) by τpost. On the other hand, when eliminating an interference wave which is advanced on the side of the antenna AT1, delaying by 2×DMAX is performed by the fixed delay circuit 40. And, the replica generation portion 41 generates an advanced wave replica signal x1"(t) obtained by delaying the signal x2'(t) by DMAX−τpre. In this case, the output signal x2'(t) of the equalizer 10-2 must be further delayed by DMAX, and must be input to the weight control portion 14 and to the spatial diversity combining portion 16.

Figure 16:
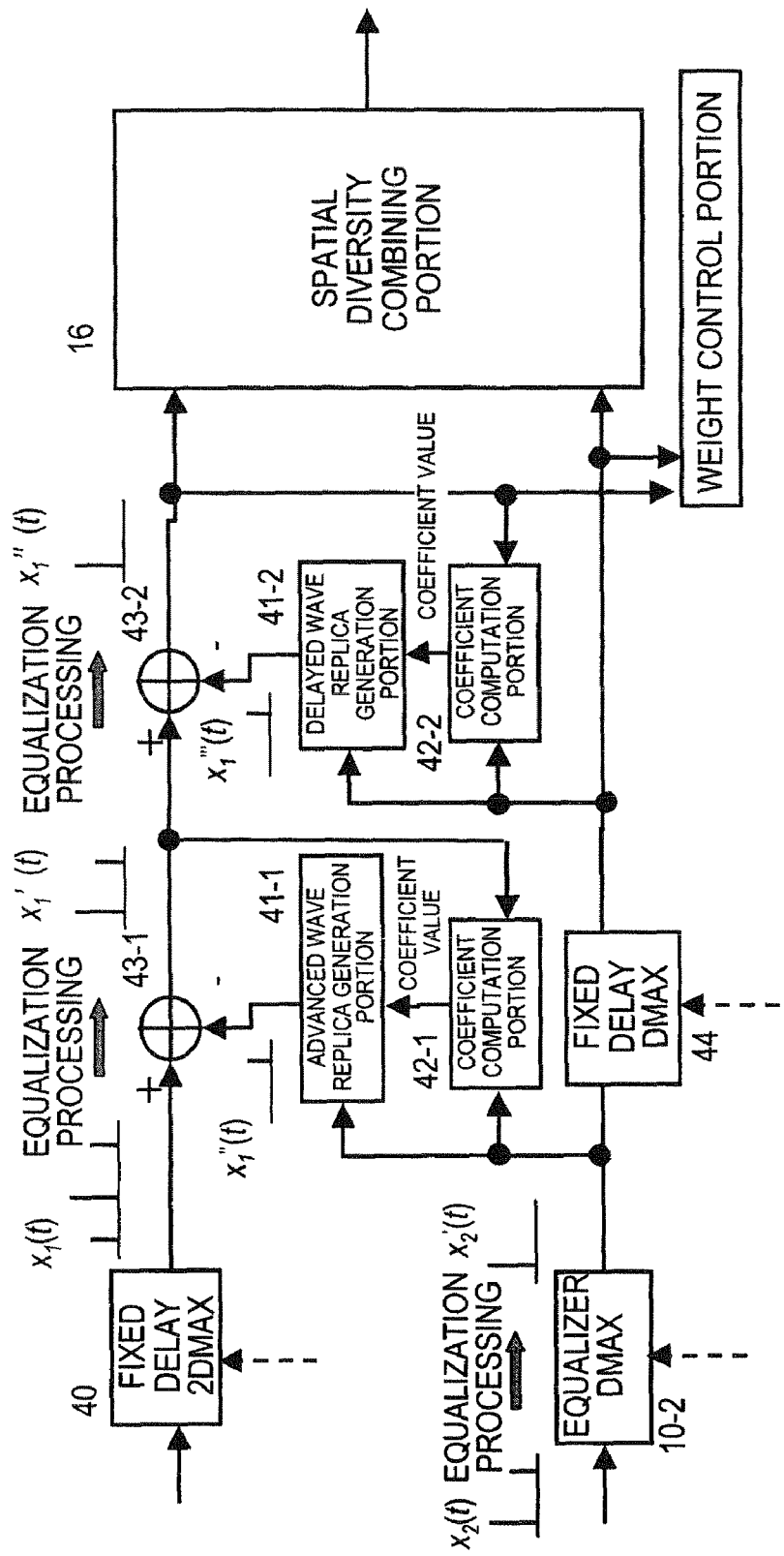
FIG. 16 depicts the detailed configuration of adaptive equalizing means on the side of the antenna AT1 of the receiver of FIG. 15.

FIG. 16 depicts the detailed configuration of adaptive equalizing means on the side of the antenna AT1 of the receiver of FIG. 15. In the example of FIG. 16, both a delayed interference wave and an advanced interference wave on the side of the antenna AT1 can be equalized. That is, the fixed delay circuit 40 causes a delay by 2×DMAX, the advanced wave replica generation portion 41-1 generates an advanced wave replica signal x1"(t) by delaying the output signal x2'(t) by DMAX−τpre, and the delayed wave replica generation portion 41-2 generates a delayed wave replica signal x1'"(t) by delaying the output signal x2'(t) by DMAX+τpost. And, the subtractor 43-1 eliminates the advanced interference wave, and the subtractor 43-2 eliminates the delayed interference wave. Further, the fixed delay circuit 44 delays the output signal x2'(t) of the equalizer by DMAX.

Figure 17:
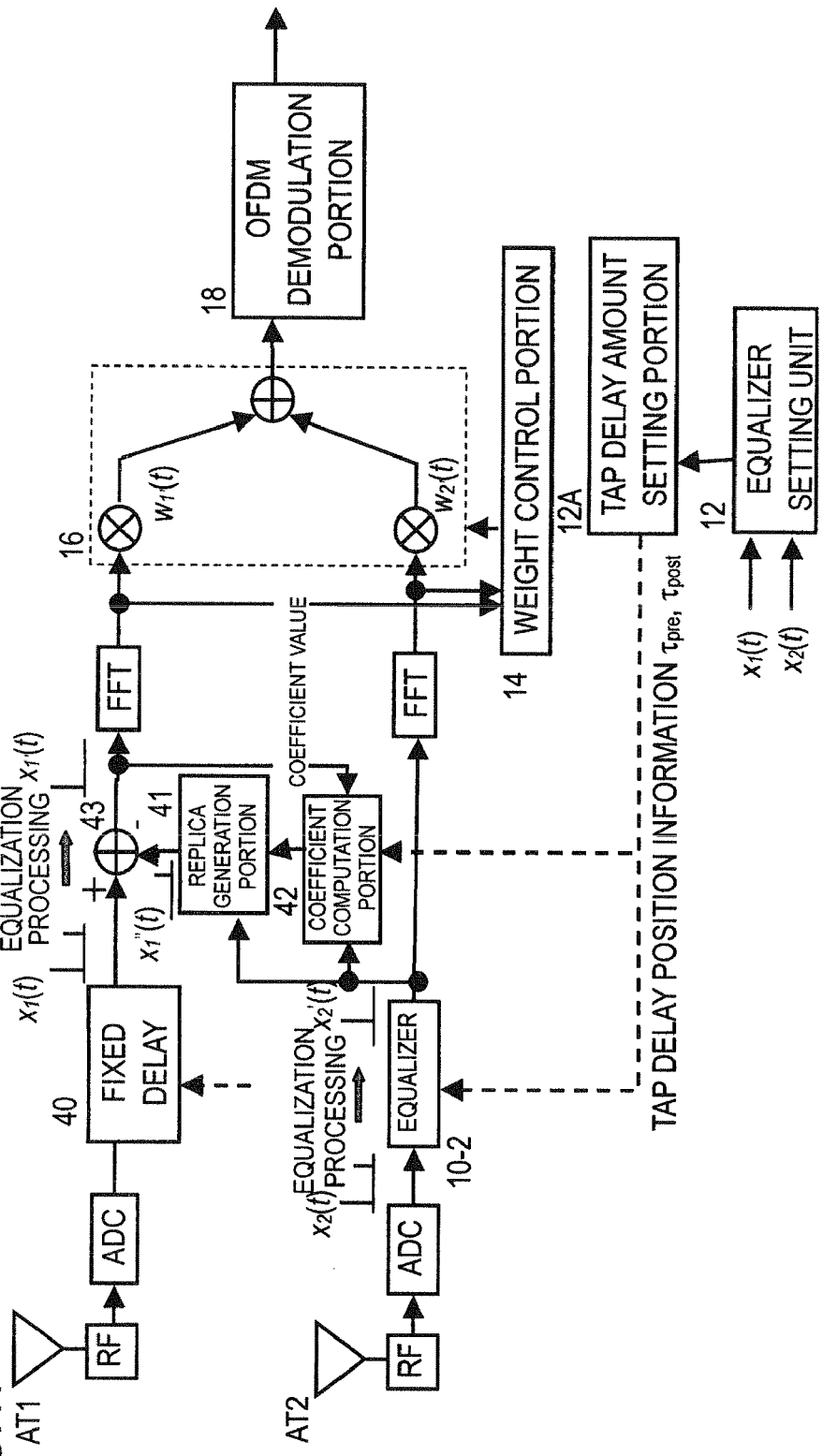
FIG. 17 depicts the configuration of a modified example of the receiver in the second embodiment.

FIG. 17 depicts the configuration of a modified example of the receiver in the second embodiment. In this example, differing from FIG. 15, the FFT is provided in the stage before the spatial diversity combining portion 16. Otherwise the configuration is the same as in FIG. 15. Further, the adaptive equalizing means on the side of the antenna AT1 in FIG. 17 can be configured as depicted in FIG. 16.

In both the modified examples of FIG. 14 and FIG. 17, after FFT an OFDM frequency-domain signal is input to the weight control portion 14, therefore compared with the examples of FIG. 7 and FIG. 15, estimation of the arrival angles for each of the antennas is easy. Hence utilizing the arrival angles estimated by the weight control portion 14, the equalizer setting unit 12 may decide interference waves to be equalized.

Figure 18:
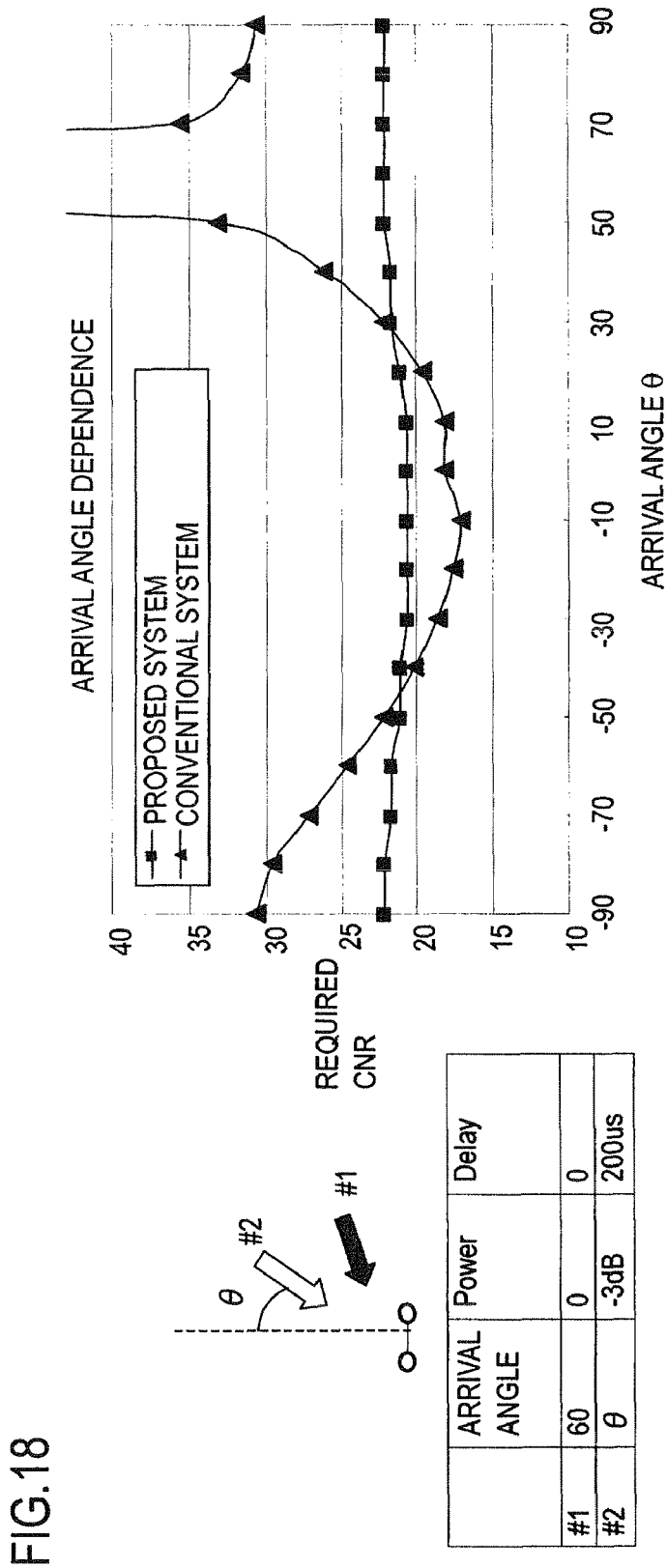
FIG. 18 depicts the results of simulations.

FIG. 18 depicts the results of simulations. These simulation results depict required CNR characteristics when the arrival angle of a desired wave #1 was fixed at 60°, and the arrival angle θ of an interference wave was varied. The required CNR characteristics are defined to be CNR values satisfying, for a 64 QAM modulation method in ISDB-T, a BER characteristic of $2 \times 10^{-4}$ at a coding rate of 2/3.

As depicted in FIG. 18, upon comparing the required CNR values for the receiver of this embodiment and for the conventional receiver, it is seen that when the arrival angle θ of the interference wave approached the arrival angle 60° of the desired wave, the required CNR value for the conventional system became high, and reception performance was worsened. On the other hand, in the case of the receiver of this embodiment, it can be seen that a substantially constant required CNR value could be obtained regardless of the arrival angle θ of the interference wave, and that even when the interference wave existed at θ=60°, coinciding with the arrival angle of 60° of the desired wave, the interference wave was eliminated by the adaptive equalizer, so that reception was possible without problem.

Third Embodiment

FIG. 19 depicts the configuration of a receiver which employs an equalizer output as a reference signal in a TAP coefficient computation portion in an equalizer. FIG. 19, like the receiver depicted in FIG. 7, has a group 10 of adaptive equalizers 10-1 to 10-N which respectively equalize the digital reception signals $x_1(t)$ to $x_N(t)$ from the antennas AT1 to ATN; a spatial diversity combining portion 16 which performs spatial diversity combining of the output signals $x_1'(t)$ to $x_N'(t)$ of the equalizers; and an FFT demodulation portion 17, 18 which performs FFT processing of the combined time-domain reception signals, converting them into frequency-domain reception signals, and demodulates subcarriers at a plurality of frequencies.

Further, in FIG. 19 also, the equalizer setting unit and TAP delay amount setting unit 12 set in the equalizer group 10 the delay amounts τpre, τpost for interference waves which cannot be eliminated by the spatial diversity combining portion 16, based on output signals of the spatial diversity combining portion.

Figure 20A:
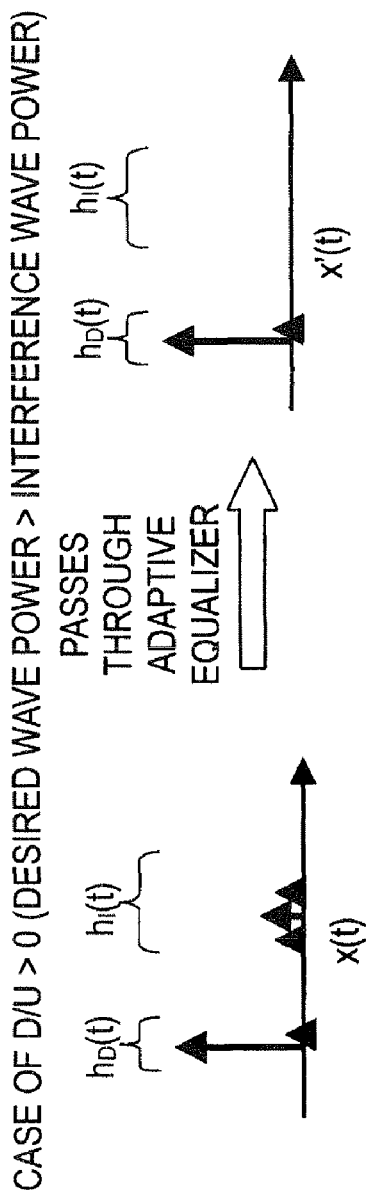
FIG. 20 explains operation of the receiver of FIG. 19.

FIG. 20 explains operation of the receiver of FIG. 19. In all cases the interference waves $h_I(t)$ are delayed waves with respect to the desired waves $h_D(t)$. FIG. 20A depicts a case in which the power of the desired wave $h_D(t)$ is greater than the power of the interference waves $h_I(t)$. In this case, as explained above, by setting the delay time of the interference waves $h_I(t)$ in the equalizers, the equalizers can suppress or eliminate interference waves $h_I(t)$ corresponding to the set delay time. Hence the interference waves $h_I(t)$ are eliminated from the equalizer output x'(t) in FIG. 20A.

Figure 20B:
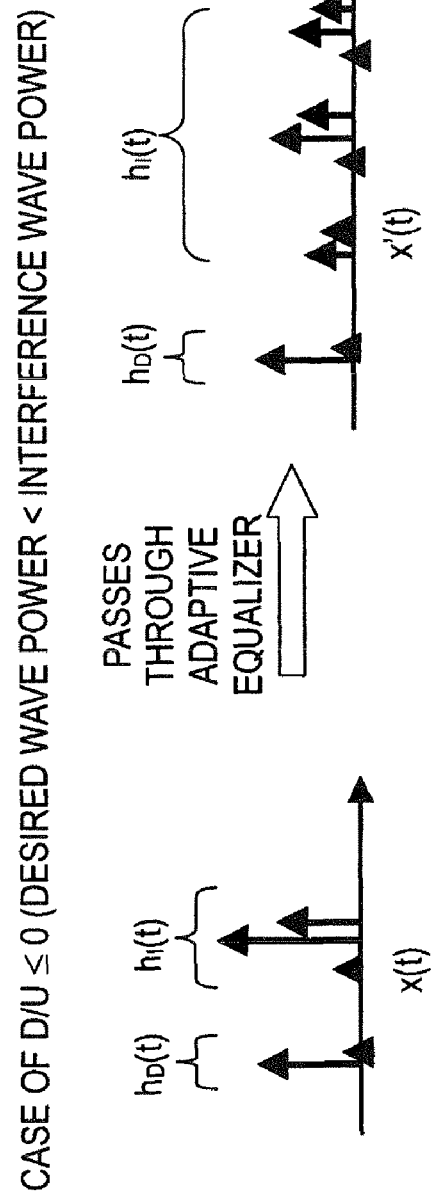

On the other hand, FIG. 20B depicts a case in which the power of the interference waves $h_I(t)$ is greater than the power of the desired wave $h_D(t)$. In this case, a large quantity of interference waves $h_I(t)$ appears in the output x'(t) after passing through the equalizers. The reason for this is that because the power of the interference waves $h_I(t)$ is high, the power of electric waves corresponding to interference waves in the replica signal generated by the equalizing filter in the equalizers is increased, and when the TAP coefficient computation portion in the equalizers takes the equalizer output x'(t) as a reference signal to determine a correlation value with the pre-equalization signal x(t) and computes TAP coefficients, the TAP coefficients diverge.

FIG. 21 explains divergence of TAP coefficients. This FIG. 21 corresponds to the above-described FIG. 12, and depicts operation of the delayed wave equalizing filter 32 and TAP coefficient computation portion 33. FIG. 21 differs from FIG. 12 in that the power of the delayed wave d1, which is an interference wave, is greater than that of the main wave MW, which is a desired wave. Hence in the delayed wave equalizing filter 32 depicted in FIG. 9, in the delayed wave replica signal Y(t) generated by delaying by the set delay time τpost and multiplying by a TAP coefficient, the power of the delayed wave d1-R which is an interference wave is greater than that of the main wave MW-R.

The main wave MW-R of this delayed wave replica signal Y(t) is subtracted from the delayed wave d1 of the pre-equalization signal $X2(t)$, and the delayed wave d1-e of the equalized signal $E2(t)$ is suppressed or eliminated. However, at the same time the delayed wave d1-R, with power greater than that of the eliminated delayed wave d1, remains. This must be eliminated using the main wave MW-R2 of a second delayed wave replica signal Y(t)–2. In this way, in an IIR filter such as the delayed wave equalizing filter 32, if the power of a delayed wave is greater than that of the main wave which is a desired wave, the power of equalizing remainders of replica signals (d1-e, d1-R, d1-R2) increases.

And, as depicted in FIG. 11, in the TAP coefficient computation portion 33 the equalized signal $E2(t)$ is used as a reference signal r(t), and the correlation value of this reference signal $r(t)=E2(t)$ and the pre-equalization signal $X2(t)$ delayed by the delay time τpost is computed; the result of attenuation and integration of this is provided as a TAP coefficient to the delayed wave equalizing filter. That is, correlation value computation in the TAP coefficient computation portion is computation to determine the correlation value of the main wave MW-d obtained by delaying the pre-equalization signal $X2(t)$ and the delayed wave d1-e of the equalized signal $E2(t)=r(t)$, indicated by the dashed lines in FIG. 21. However, this delayed wave d1-e originally has greater power than the main wave, as stated above, and so there are cases in which the TAP coefficient diverges due to increases in the delayed wave d1-R of the replica signal.

In particular, when as in FIG. 20B a plurality of delayed interference waves $h_I(t)$ exists for the desired wave $h_D(t)$, there is the above-described problem of TAP coefficient divergence in the IIR filter. When there is one main wave and one delayed wave, by regarding the delayed wave with high power as the desired wave and the main wave as an advanced wave, the advanced wave can be eliminated by an FIR filter which is the advanced wave filter of FIG. 10. Hence in the case of an FIR filter, the problem of TAP coefficient divergence does not occur.

Figure 22:
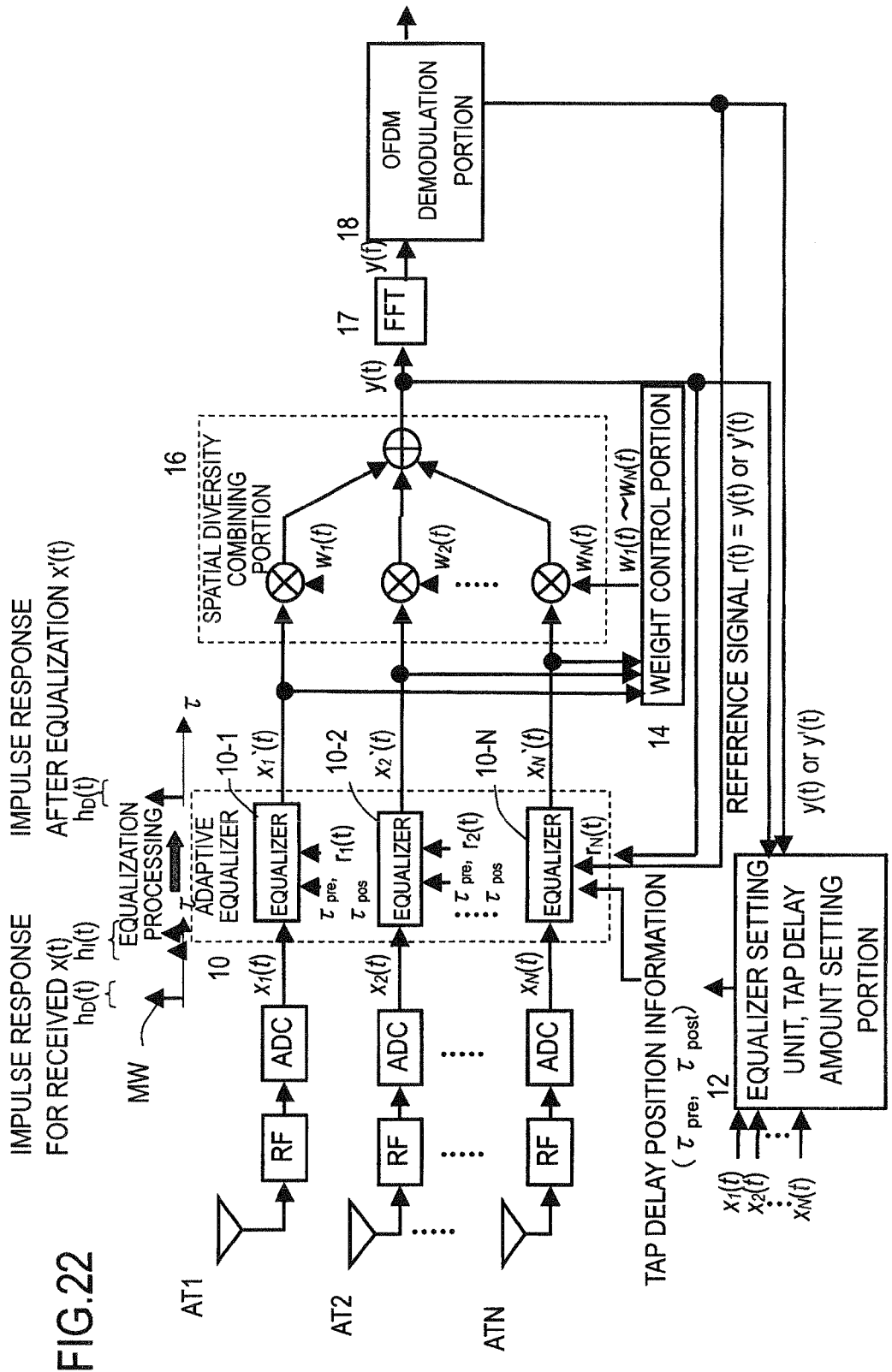
FIG. 22 depicts the configuration of the receiver of a third embodiment.

FIG. 22 depicts the configuration of the receiver of a third embodiment. The receiver of FIG. 22 differs from those of FIG. 7, FIG. 8, and FIG. 19 in that the reference signal r(t) input to the equalizers 10-1 to 10-N is either the time-domain reception signal y(t) which is the output of the spatial diversity combining portion 16, or is the time-domain signal y'(t) obtained by FFT processing this signal y(t) by the FFT portion 17, and then again performing IFFT by the OFDM demodulation portion 18 of the resulting frequency-domain reception signal y(f).

Further, similarly to FIG. 7 and FIG. 8, one of the time-domain signals y(t) or y'(t) is provided to the equalizer setting unit and the TAP delay amount setting portion 12. By this means, the equalizer setting unit and TAP delay amount setting portion 12 detect the interference waves detected from the pre-equalization signals $x_1(t)$ to $x_N(t)$ and the delay times thereof, and the interference waves that could not be adequately suppressed or eliminated by the spatial diversity combining portion 16 and the delay times thereof, and can decide delay times for interference waves that are to be suppressed or eliminated by equalizers. Otherwise the configuration is similar to that of FIG. 7 and FIG. 19.

Figure 23:
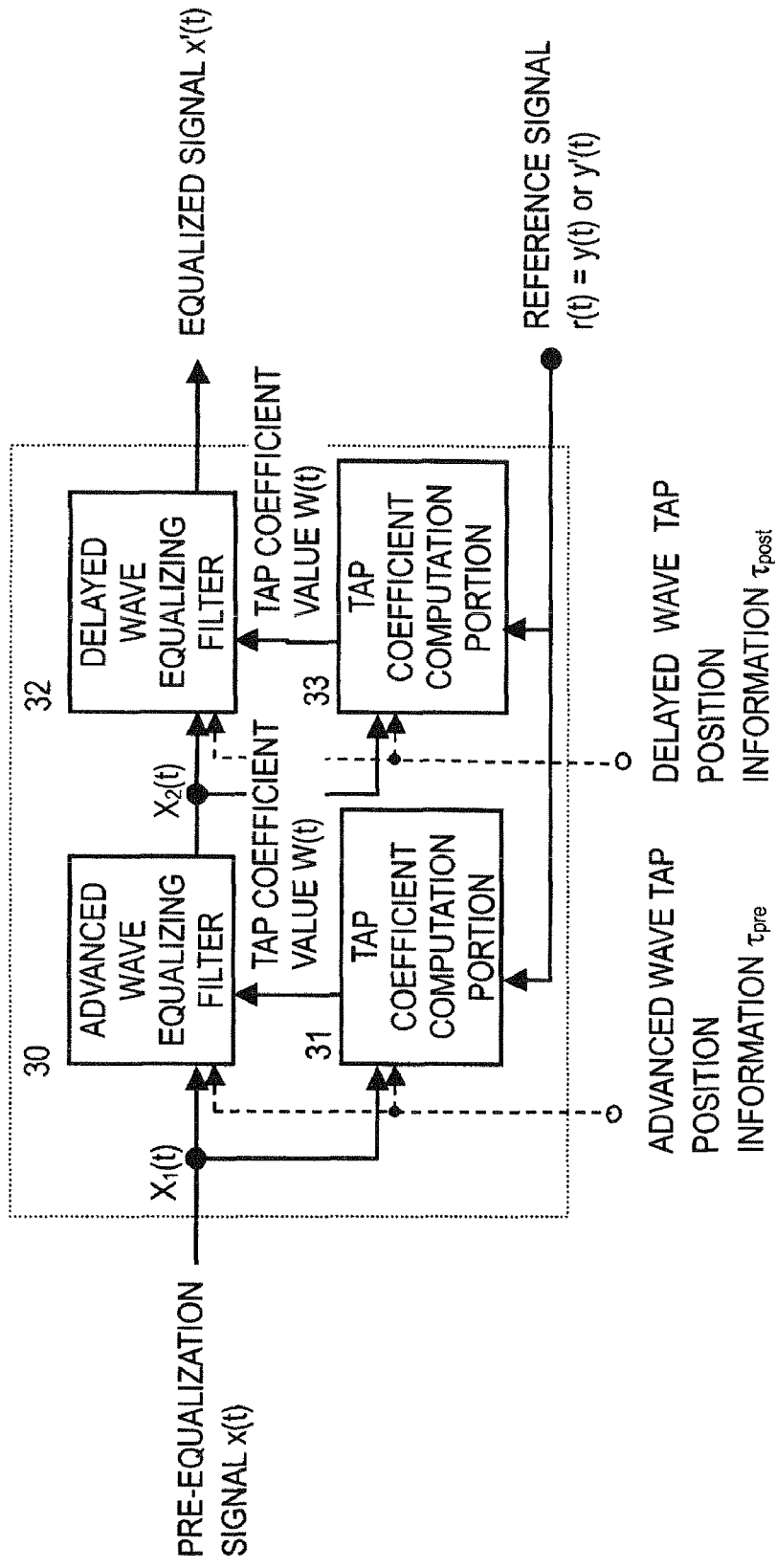
FIG. 23 depicts the configuration of adaptive equalizers 10-1 to 10-N in the third embodiments.

FIG. 23 depicts the configuration of adaptive equalizers 10-1 to 10-N in the third embodiments. The adaptive equalizer of FIG. 23, similarly to that of FIG. 8, has an advanced wave equalizing filter 30 to eliminate advanced waves from the pre-equalization signal x(t) and a TAP coefficient value computation portion 31 which supplies TAP coefficient values W(t) thereto, and, also has a delayed wave equalizing filter 32 to eliminate delayed waves and a TAP coefficient computation portion 33 to supply TAP coefficient values W(t) thereto.

However, the adaptive equalizer of FIG. 23 differs from that of FIG. 8 in that time-domain signals y(t), y'(t) output from the spatial diversity combining portion 16 are input as reference signals r(t) to the TAP coefficient computation portions 31 and 33 respectively. That is, the pre-equalization signal X1(t) and the reference signal r(t)=y(t) or y'(t) are input to the TAP coefficient computation portion 31 on the side of the advanced wave equalizing filter 30, and as explained using FIG. 11, the signal obtained by delaying the pre-equalization signal X1(t) by the delay position information τpre is multiplied by the complex conjugate of the reference signal r(t) to perform correlation value computation. Similarly, the pre-equalization signal X2(t) and the reference signal r(t)=y(t) or y'(t) are input to the TAP coefficient computation portion 33 on the side of the delayed wave equalizing filter 32, and the signal obtained by delaying the pre-equalization signal X2(t) is multiplied by the complex conjugate of the reference signal r(t) to perform correlation value computation.

The advanced wave equalizing filter 30 is the same as that depicted in FIG. 10. The delayed wave equalizing filter 32 is the same as that depicted in FIG. 9. And, the TAP coefficient computation portions 31, 33 are the same as that depicted in FIG. 11.

In this way, in the third embodiment, the TAP coefficient computation portion 33 computes TAP coefficients for the adaptive equalizer based on the correlation value of the pre-equalization signal x(t) and the output signal y(t) or y'(t) of the spatial diversity combining portion 16. Then, through operation of the spatial diversity combining portion 16, the power of the delayed signal d1 of the output signal y(t) or y'(t) is attenuated, so that divergence of a TAP coefficient can be avoided. And, by determining TAP coefficients through the correlation value with interference waves remaining in the output signals y(t), y'(t) obtained after passing through both the adaptive equalizer and the spatial diversity combining portion, interference waves can be reliably suppressed or eliminated by the adaptive equalizer.

Figure 24:
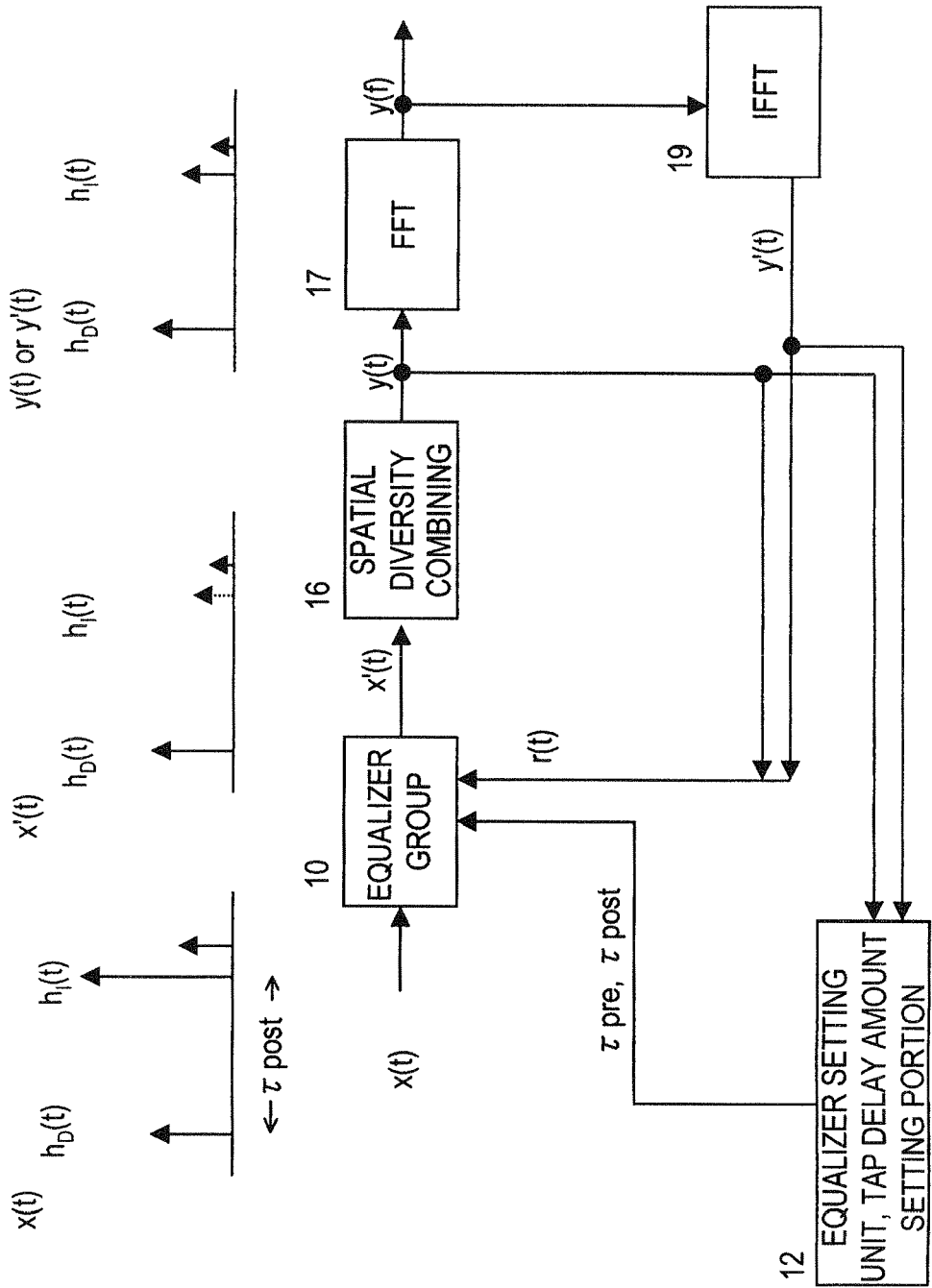
FIG. 24 explains operation of the receiver of the third embodiment.

FIG. 24 explains operation of the receiver of the third embodiment. As depicted in the figure, a case is assumed in which the pre-equalization signal x(t) includes a desired wave $h_D(t)$ and a plurality of interference waves $h_I(t)$ having greater power than the desired wave $h_D(t)$. In this case, the interference wave having greater power among the interference waves $h_I(t)$ must be eliminated by the adaptive equalizer.

In the third embodiment, the output signal y(t) of the spatial diversity combining portion 16, or the signal y'(t) obtained by performing IFFT once again by the IFFT portion 19 after performing FFT on this signal by the FFT portion 17, is fed back to the TAP coefficient computation portion 33 within the equalizer group 10 as a reference signal. Through beam steering and null steering by the spatial diversity combining portion 16, the power of the interference waves $h_I(t)$ is attenuated. Hence by using the output signal y(t) or y'(t) which has passed through this spatial diversity as a reference signal, divergence of TAP coefficients computed by the TAP coefficient computation portion can be suppressed or prevented. As a result, in the equalizer group 10, the interference wave $h_I(t)$ with highest power can be appropriately equalized, and can be suppressed or eliminated.

As explained above, in a case of two waves including one desired wave $h_D(t)$ and one interference wave $h_I(t)$, the wave with higher power is regarded as the desired wave, and the advanced wave can be taken to be an interference wave and eliminated by the adaptive equalizer. However, as described above, when there are a plurality of interference waves besides the desired wave, simple elimination is not possible.

FIG. 25 is a separate explanation of operation of the receiver of the third embodiment. As depicted in the figure, the pre-equalization signal x(t) includes an interference wave $h_I(t)$ having power greater than that of the desired wave $h_D(t)$. At the time of the start of equalization operation by the equalizer of FIG. 25A, even after passing through the equalizer, the high-power interference wave $h_I(t)$ cannot be eliminated from the equalized signal x'(t). However, upon passing through the spatial diversity combining portion 16, the interference wave $h_I(t)$ is attenuated in the output signals y(t), y'(t) by the spatial diversity effect. In the third embodiment, the TAP coefficient computation portion of the adaptive equalizer computes TAP coefficients using the output signals y(t), y'(t) as reference signals.

Hence when operation of the adaptive equalizer stabilizes, there is no divergence of TAP coefficients, and interference waves with high power $h_I(t)$ in the pre-equalization signal x(t) are eliminated or suppressed in the equalized signal x'(t). Also, interference waves $h_I(t)$ are greatly attenuated in the output signals y(t), y'(t) of the spatial diversity combining portion.

The time until stabilization of the spatial diversity combining portion 16 is generally longer than for the adaptive equalizer. In such cases, the output of the spatial diversity combining portion prior to stabilization may have interference waves with high power. Hence it is not preferable that the output of the spatial diversity combining portion prior to stabilization be used as a reference signal by the TAP coefficient computation portion. If the signals are output signals y(t), y'(t) after stabilization of operation of the spatial diversity combining portion, interference waves are suppressed, and so it is preferable that the signal be supplied to the TAP coefficient computation portion as a reference signal.

Fourth Embodiment

Figure 26:
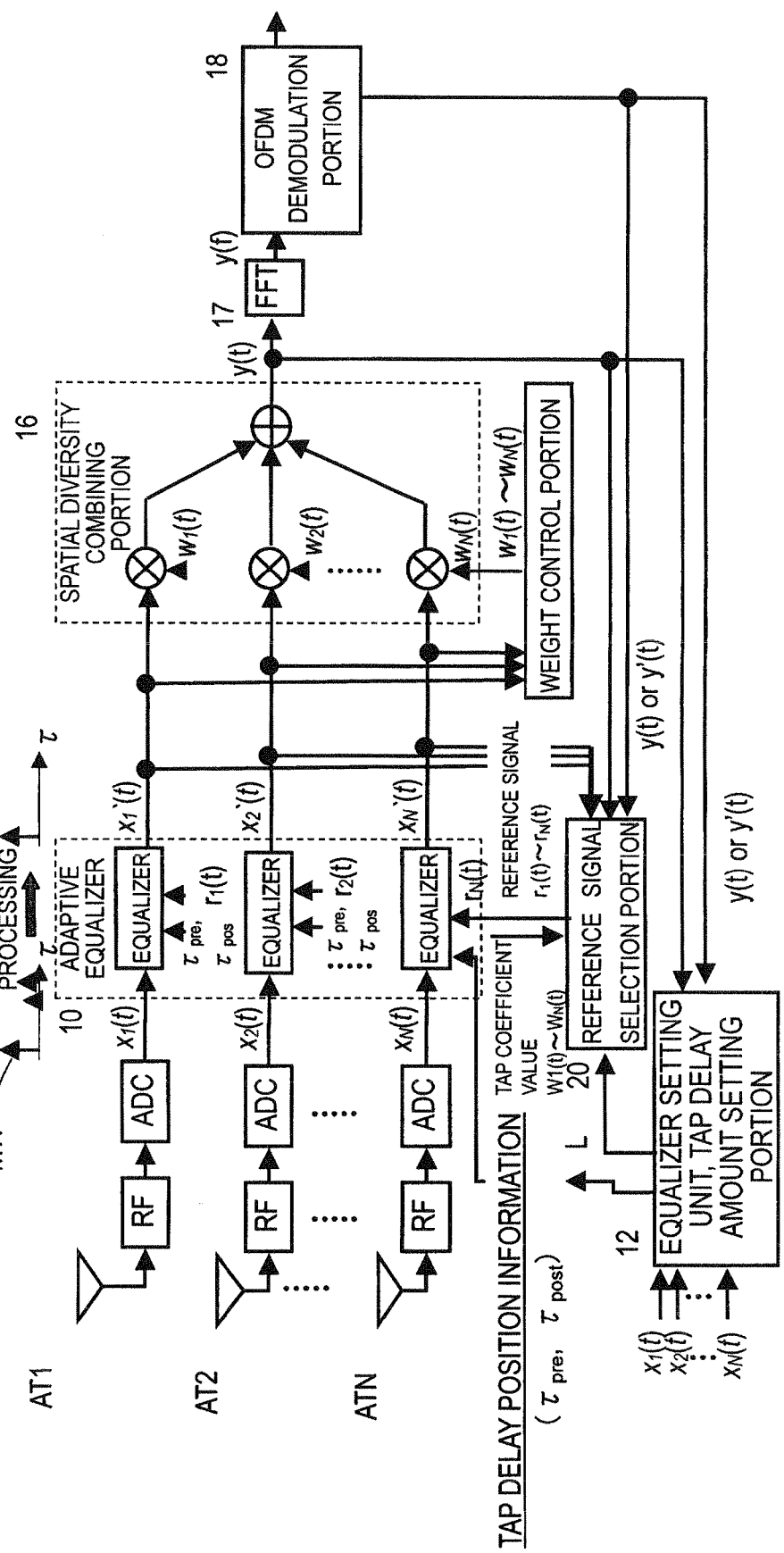
FIG. 26 depicts the configuration of the receiver in a fourth embodiment.

FIG. 26 depicts the configuration of the receiver in a fourth embodiment. The receiver of FIG. 26 differs from the receiver of the second embodiment in FIG. 22 in having a reference signal selection portion 200, which selects the reference signals $r_1(t)$ to $r_N(t)$ supplied to the equalizer group 10 from among the output signals y(t) or y'(t) of the spatial diversity combining portion 16, and the output signals $x_1'(t)$ to $x_N'(t)$ of the equalizer group. Otherwise the configuration is the same as in FIG. 22.

Figure 27:
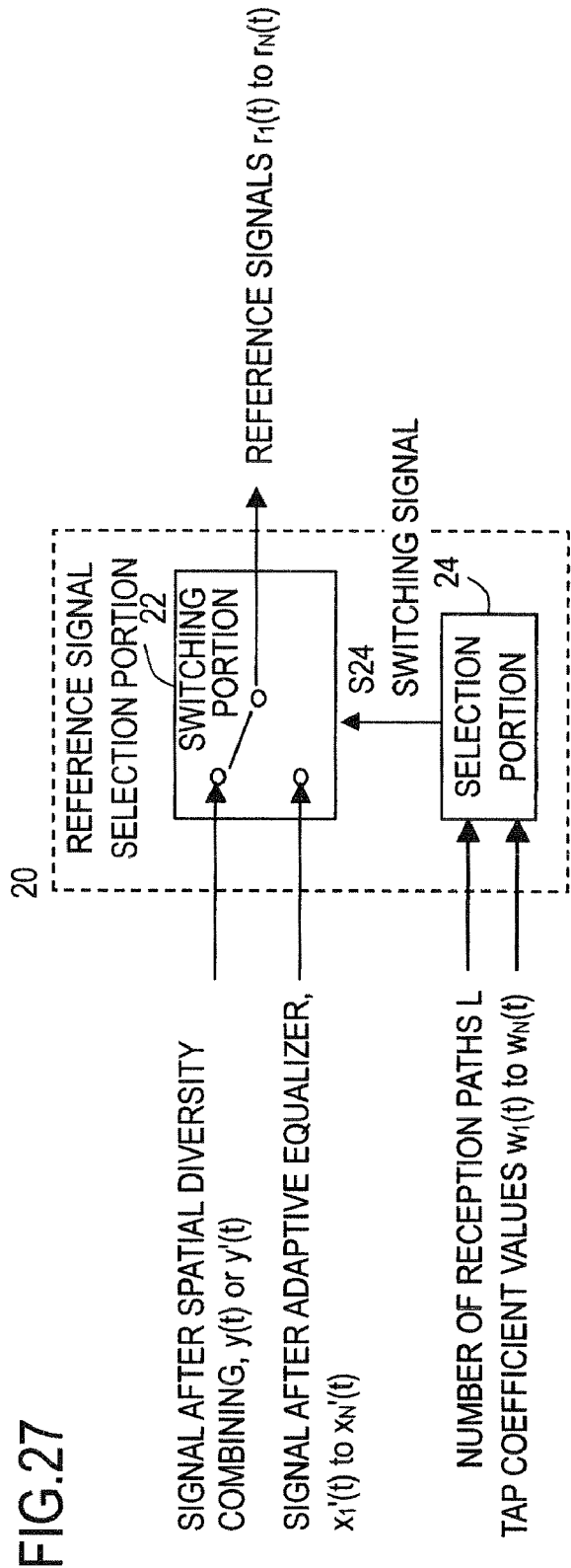
FIG. 27 depicts the configuration of the reference signal selection portion 20.

FIG. 27 depicts the configuration of the reference signal selection portion 20. The reference signal selection portion 20 has a selection portion 24 which generates a switching signal S24, and a switching portion 22 which, according to the switching signal S24, switches between the output signal y(t) or y'(t) of the spatial diversity combining portion, or the output signals $x_1'(t)$ to $x_N'(t)$ of the adaptive equalizer, for outputting as a reference signal.

The selection portion 24 generates the switching signal S24 based on the number L of interference waves to be eliminated and the TAP coefficient values $w_1(t)$ to $w_N(t)$ of the adaptive equalizer. As explained below, first, the selection portion 24 generates a switching signal S24 which selects the output signal of the spatial diversity combining portion when the TAP coefficient value power is higher than a reference value. Second, when the power of the TAP coefficient value is equal to or less than the coefficient value, and in addition the number L of interference waves to be eliminated exceeds the number M of adaptive equalizers (the number of interference waves that can be eliminated by adaptive equalizers), the selection portion 24 generates a switching signal S24 which selects the output signal of the spatial diversity combining portion. And third, when the TAP coefficient value is equal to or below a reference value, and moreover the number L of interference waves to be eliminated is equal to or less than the number M of adaptive equalizers, the selection portion 24 generates a switching signal S24 which, after the start of operation, selects the adaptive-equalized signal which is the output signal of the adaptive equalizer until the spatial diversity combining portion 16 stabilizes, and after stabilization, generates a switching signal S24 which selects the output signal of the spatial diversity combining portion.

The relation of the three types of operation of the selection portion 24 described above is as follows.

Figure 28:
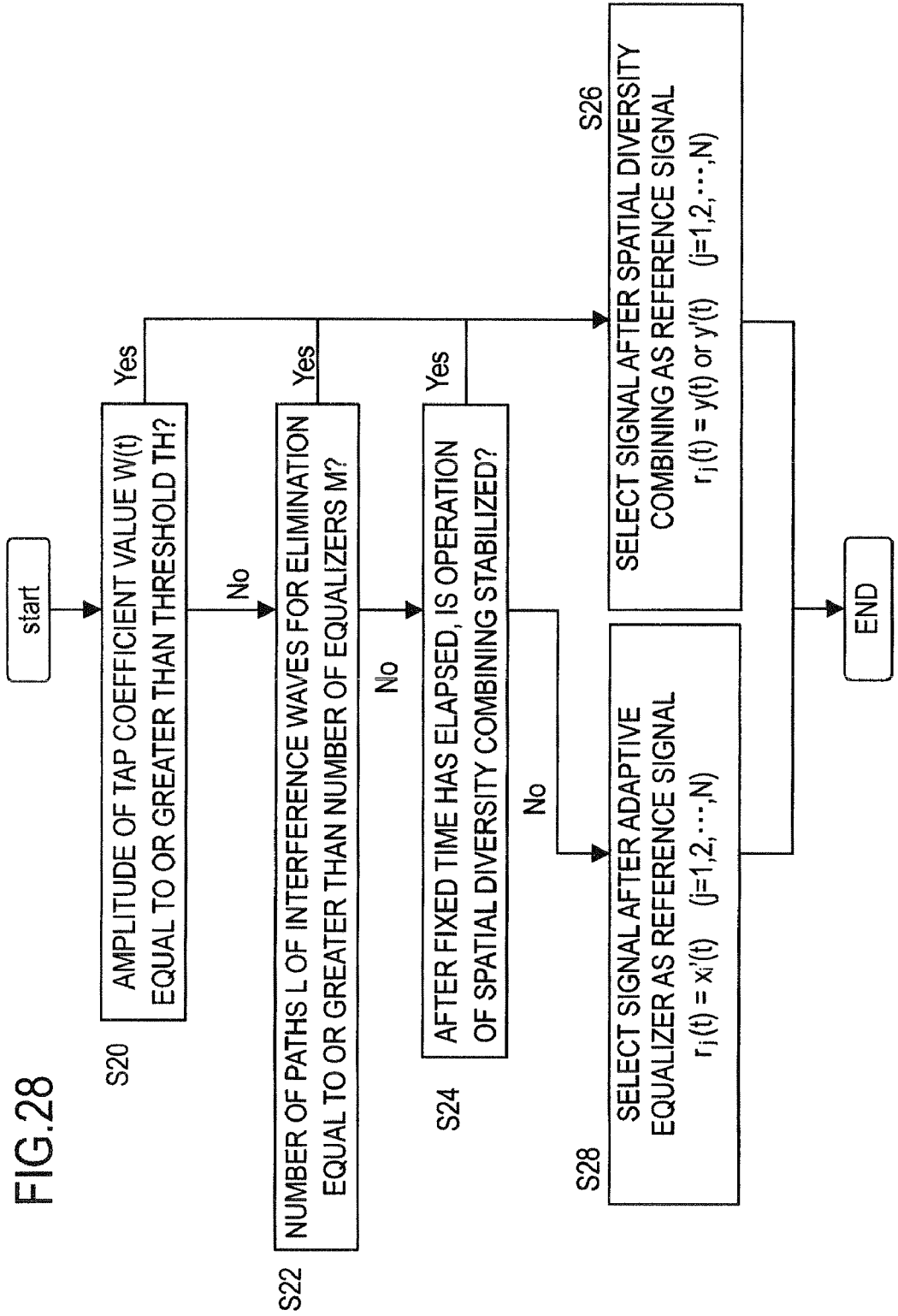
FIG. 28 is a flowchart depicting operation in the fourth embodiment.

FIG. 28 is a flowchart depicting operation in the fourth embodiment. First, the reference signal selection portion 20 monitors the TAP coefficient values $w_1(t)$ to $w_N(t)$ of the adaptive equalizer group 10, and when greater than a reference value (YES in S20), because this means that the power of delayed interference waves is greater than that of the desired waves and so the TAP coefficients are diverging, selects as the reference signal r(t) the output signal y(t) or y'(t) of the spatial diversity combining portion (S26). By this means, as in the explanation using FIG. 24 and FIG. 25 of the third embodiment, delayed interference waves can be suppressed or eliminated without divergence of TAP coefficient values. Further, when the TAP coefficient values $w_1(t)$ to $w_N(t)$ of the adaptive equalizer group 10 are equal to or below the reference value (NO in S20), the reference signal selection portion 20 selects one of the signals as the reference signal according to the following conditions.

Second, when the TAP coefficient values are equal to or below the reference value (NO in S20), and the number L of interference waves to be eliminated exceeds the number M of adaptive equalizers (the number of interference waves which can be eliminated by the adaptive equalizers) (YES in S22), the reference signal selection portion 20 selects an output signal of the spatial diversity combining portion as a reference signal (S26). That is, when the number of interference waves to be eliminated exceeds the number of interference waves which can be eliminated by the adaptive equalizer, the interference waves cannot be eliminated by the adaptive equalizer alone. Hence at least a portion of the interference waves is eliminated or suppressed by beam steering and null steering of the spatial diversity combining portion, and based on this result, the equalizer setting unit and TAP delay amount setting portion 12 detect interference waves to be equalized and set the delay amounts thereof. By this means, the adaptive equalizer 10 equalizes and attenuates or eliminates the remaining interference waves which could not be eliminated by the spatial diversity combining portion.

Figure 29:
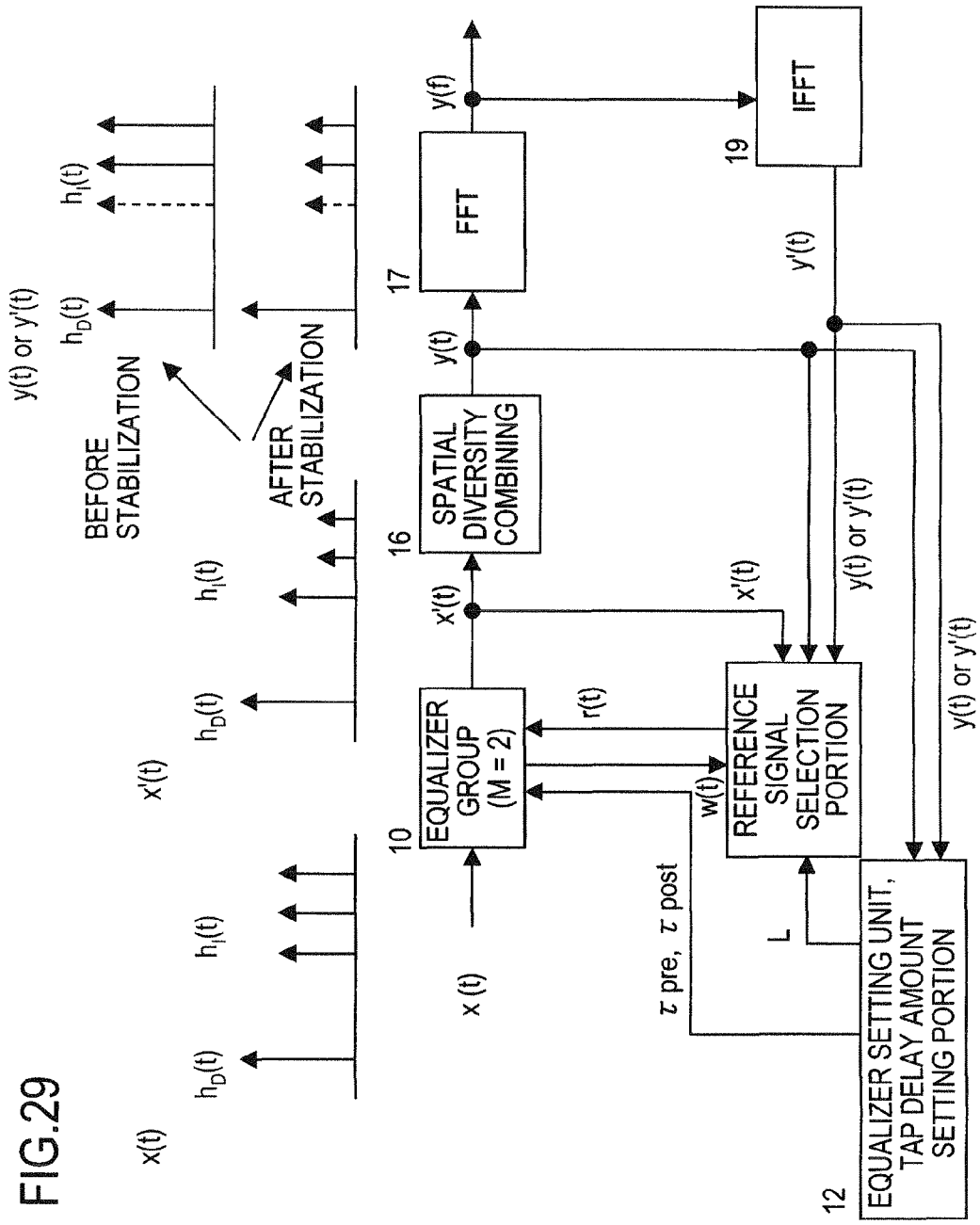
FIG. 29 explains second control.

FIG. 29 explains second control. In this example, suppose that the number of interference waves that can be eliminated by the adaptive equalizer is M=2, and the number of interference waves $h_I(t)$ to be eliminated L is 3. In FIG. 29, there exist three interference waves in the pre-equalization signal x(t) as interference waves $h_I(t)$ to be eliminated. Hence L>M. And, in the output signal y(t) or y'(t) of the spatial diversity combining portion 16, of the three interference waves to be eliminated, the signal on the left end is suppressed or eliminated. The equalizer setting unit and TAP delay amount setting portion 12 identify, from the output signal y(t) or y'(t), the two interference waves to be eliminated by the adaptive equalizer, and sets TAP delay amounts corresponding to these in the adaptive equalizer. As a result, in the output signal of the adaptive equalizer (the signal after adaptive equalization) x'(t), the two interference waves on the right side are suppressed or eliminated.

In this second control, because there are cases in which the power of the interference waves $h_I(t)$ to be eliminated in the output signal y(t) or y'(t) is excessive until the spatial diversity combining portion 16 stabilizes, it is preferable that the reference signal selection portion 20 select, as a reference signal, the output signal y(t) or y'(t) after stabilization of the spatial diversity combining portion 16. And, after operation stabilization, the interference wave components of the output signal of the spatial diversity combining portion are uniformly suppressed by spatial diversity combining, so that after operation stabilization, by supplying this as a reference signal r(t) to the adaptive equalizer, the adaptive equalizer can appropriately equalize the interference waves. That is, the TAP coefficient value computation portion 33 within the adaptive equalizer can compute the correlation of the interference waves to be eliminated remaining in the final-stage output signal y(t) or r(t) and the desired waves of the pre-equalization signal. By this means, the delayed wave equalizing filter of the adaptive equalizer can eliminate delayed interference waves in the output signal of the final stage more appropriately than when taking the equalizer output signal x'(t) as a reference signal.

Third, when the AP coefficient values are equal to or below the reference value (NO in S20), and the number of interference waves to be eliminated L is equal to or less than the number of adaptive equalizers M (NO in S22), after the start of operation until the spatial diversity combining portion 16 stabilizes (NO in S24), the reference signal selection portion 20 selects as the reference signal the adaptive-equalized signal which is the output signal of the adaptive equalizer (S28), and after stabilization selects as the reference signal the output signal of the spatial diversity combining portion (S26).

FIG. 30 explains third control. In this example, the number of interference waves which can be eliminated by the adaptive equalizer is M=2, and the number of interference waves $h_I(t)$ to be eliminated L is 2. In FIG. 30, there exist two interference waves in the pre-equalization signal x(t) as interference waves to be eliminated $h_I(t)$. That is, L≦M. However, the power of the interference waves $h_I(t)$ is not greater than that of the desired waves $h_D(t)$. In such a case, the adaptive equalizer 10 alone can eliminate two interference waves.

In this case, in the output signal of the spatial diversity combining portion 16, the power of the interference waves $h_I(t)$ may be excessive until the operation stabilizes. Hence until operation stabilization the output signal of the equalizer (the adaptive-equalized signal) x'(t) is supplied to the adaptive equalizer as a reference signal r(t). By this means, divergence of TAP coefficients is avoided. On the other hand, after operation stabilization, the output signal y(t) or y'(t) of the spatial diversity combining portion 16 is supplied to the adaptive equalizer as a reference signal r(t). By finally using as the reference signal the output signal of the spatial diversity combining portion, the TAP coefficient value computation portion 33 within the adaptive equalizer can compute the correlation of the interference waves to be eliminated remaining in the final-stage output signal y(t) or y'(t) and the desired waves of the pre-equalization signal, and interference waves can be appropriately eliminated by the adaptive equalizer.

In this way, by means of the receiver of the fourth embodiment, an appropriate signal is selected from among either an equalized signal or a signal after spatial diversity combining as a reference signal for computation by the TAP coefficient value computation portion of the equalizer, so that appropriate equalization processing can be performed by the optimal equalizer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has been described in detail, it should be understood that the various changes, substitutions, and alterations could be made hereto without departing from the spirit and scope of the invention.

What is claimed is:

1. A receiver which receives a reception signal subjected to orthogonal frequency division multiplexing modulation or orthogonal frequency division multiple access modulation, the receiver comprising:
    an array antenna having a plurality of antennas for receiving the reception signal;
    adaptive equalizers, each of which is provided in each of the plurality of antennas, and each of which reduces advanced waves or delayed waves having a delay time set with respect to a main wave in the reception signal;
    a spatial diversity combining portion which multiplies each of output signals of the adaptive equalizers by a weighting coefficient and adds the multiplied signals;
    a weight control portion which generates the weighting coefficient based on each of the output signals of the adaptive equalizers; and
    an equalizer setting unit which estimates an arrival angle for each path and a delay time for each path of the reception signal, and based on each of the estimated arrival angles and delay times of a plurality of paths, decides an interference wave for elimination to be eliminated by the adaptive equalizers among interference waves whose delay time with respect to the main wave exceeds a guard interval time, and sets in the adaptive equalizers the delay time of the interference wave for elimination with respect to the main wave.

2. The receiver according to claim 1, wherein, when the number of paths of the reception signal is greater than degrees of freedom of the diversity antenna, the equalizer setting unit decides the interference waves that exceed the degrees of freedom as the interference waves for elimination.

3. The receiver according to claim 1, wherein, when there exists an interfering wave having an arrival angle close to an arrival angle of a desired wave which includes the main wave and an advanced wave or a delayed wave whose delay time with respect to the main wave does not exceed the guard interval time, the equalizer setting unit determines the interference wave to be the interference wave for elimination.

4. The receiver according to claim 1, wherein the adaptive equalizers have a replica generator which generates a replica signal of the advanced wave or delayed wave by multiplying the main wave by a prescribed coefficient, and a subtractor which subtracts the replica signal from the reception signal.

5. The receiver according to claim 1, further comprising an FFT which performs FFT processing for an output signal of the spatial diversity combining portion to convert from an OFDM time-domain signal to an OFDM frequency-domain signal.

6. The receiver according to claim 1, further comprising an FFT which performs FFT processing for each output signal of the adaptive equalizers to convert from an OFDM time-domain signal to an OFDM frequency-domain signal and supplies the OFDM frequency-domain signal to the spatial diversity combining portion.

7. The receiver according to claim 4, wherein the adaptive equalizer for a first antenna includes a first adaptive equalizer which equalizes the advanced wave or delayed wave, for a reception signal of a first antenna; and the adaptive equalizer for a second antenna includes a replica generator which generates the replica signal from an output signal of the first adaptive equalizer, and a subtractor which subtracts the replica signal from a reception signal of a second antenna.

8. The receiver according to claim 7, wherein the first adaptive equalizer has an advanced wave equalizing filter and a delayed wave equalizing filter, which equalize the advanced wave and delayed wave respectively.

9. A receiver which receives a reception signal subjected to orthogonal frequency division multiplexing or orthogonal frequency division multiple access, the receiver comprising:
    an array antenna having a plurality of antennas for receiving the reception signal;
    adaptive equalizers, each of which is provided in each of the plurality of antennas, and each of which reduces advanced waves or delayed waves having a delay time set with respect to a main wave in the reception signal;
    an equalizer setting unit, which sets in the adaptive equalizers a delay time with respect to the main wave of an interference wave for elimination whose delay time with respect to the main wave of the reception signal exceeds a guard interval time;
    a spatial diversity combining portion which multiplies each of output signals of the adaptive equalizers by a weighting coefficient and adds the multiplied signals; and
    a weight control portion which generates the weighting coefficient based on an output signal of the adaptive equalizers, wherein
    the adaptive equalizers have: a delayed wave equalizing filter which multiplies the reception signal by a coefficient to generate a delayed wave replica signal, and subtracts the delayed wave replica signal from the reception signal; and a coefficient computation portion which computes the coefficient based on a correlation value of a signal prior to adaptive equalization by the adaptive equalizer and an output signal of the spatial diversity combining portion.

10. A receiver which receives a reception signal subjected to orthogonal frequency division multiplexing modulation or orthogonal frequency division multiple access modulation, the receiver comprising:
    an array antenna having a plurality of antennas for receiving the reception signal;
    adaptive equalizers, each of which is provided in each of the plurality of antennas, and each of which reduces advanced waves or delayed waves having a delay time set with respect to a main wave in the reception signal;
    an equalizer setting unit which sets in the adaptive equalizers a delay time with respect to the main wave of an interference wave for elimination whose delay time with respect to the main wave of the reception signal exceeds a guard interval time;
    a spatial diversity combining portion which multiplies each of the output signals of the adaptive equalizers by a weighting coefficient and adds the multiplied signals; and
    a weight control portion which generates the weighting coefficient based on an output signal of the adaptive equalizing means, wherein
    the adaptive equalizers have:
    a delayed wave equalizing filter which multiplies the reception signal with a coefficient to generate a delayed wave replica signal, and subtracts the delayed wave replica signal from the reception signal; and a coefficient computation portion which computes the coefficient based on a correlation value of a signal prior to adaptive equalization by the adaptive equalizer, and a reference signal of either a signal after adaptive equalization by the adaptive equalizer or an output signal of the spatial diversity combining portion.

11. The receiver according to claim 10, wherein, when the coefficient exceeds a reference value, the coefficient computation portion selects as the reference signal the output signal of the spatial diversity combining portion.

12. The receiver according to claim 10, wherein, when the coefficient is equal to or less than a reference value, and the number of interference waves for elimination exceeds the number of the interference wave that can be eliminated by the adaptive equalizer, the coefficient computation portion selects as the reference signal the output signal of the spatial diversity combining portion.

13. The receiver according to claim 10, wherein, when the coefficient is equal to or less than a reference value and the number of interference wave for elimination is equal to or less than the number of the interference wave that can be eliminated by the adaptive equalizer, until operation of the spatial diversity combining portion is stabilized the coefficient computation portion selects as the reference signal the signal after adaptive equalization, and after operation of the spatial diversity combining portion is stabilized, selects as the reference signal the output signal of the spatial diversity combining portion.

* * * * *